(12) United States Patent
Shi et al.

(10) Patent No.: US 10,177,683 B2
(45) Date of Patent: Jan. 8, 2019

(54) MULTI-LEVEL INVERTER

(71) Applicant: Huawei Technologies Co., Ltd., Shenzhen (CN)

(72) Inventors: Lei Shi, Shanghai (CN); Dianbo Fu, Plano, TX (US); Zhen Cao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/938,193

(22) Filed: Mar. 28, 2018

(65) Prior Publication Data

US 2018/0219492 A1    Aug. 2, 2018

Related U.S. Application Data

(63) Continuation of application No. PCT/CN2016/099893, filed on Sep. 23, 2016.

(30) Foreign Application Priority Data

Sep. 29, 2015    (CN) .......................... 2015 1 0633558

(51) Int. Cl.
*H02M 7/48* (2007.01)
*H02M 7/483* (2007.01)
(Continued)

(52) U.S. Cl.
CPC .............. *H02M 7/483* (2013.01); *H02M 5/45* (2013.01); *H02M 7/487* (2013.01); *H02M 7/537* (2013.01);
(Continued)

(58) Field of Classification Search
CPC ........ H02M 3/285; H02M 7/49; H02M 7/493; H02M 3/1584; H02M 7/53806;
(Continued)

(56) References Cited

U.S. PATENT DOCUMENTS

2006/0055581 A1    3/2006 Deval
2013/0301314 A1*   11/2013 Fu ........................ H02M 7/487
                                                                363/37
(Continued)

FOREIGN PATENT DOCUMENTS

CN        1464627 A      12/2003
CN        1464631 A      12/2003
(Continued)

OTHER PUBLICATIONS

Machine Translation and Abstract of Japanese Publication No. JP2010246189, Oct. 28, 2010, 10 pages.
(Continued)

*Primary Examiner* — Nguyen Tran

(74) *Attorney, Agent, or Firm* — Conley Rose, P.C.

(57) ABSTRACT

A multi-level inverter includes a direct current input, a first bidirectional switch, a second bidirectional switch, a third capacitor, and an inverter. The direct current input includes a first capacitor and a second capacitor connected in series between positive and negative terminals of the direct current input power supply. The inverter includes a first switching tube, a second switching tube, a third switching tube, and a fourth switching tube that are connected in series co-directionally between the positive and negative terminals of the direct current input power supply. One terminal of the first bidirectional switch is connected to a connection point between the third switching tube and the fourth switching tube.

16 Claims, 21 Drawing Sheets

(51) Int. Cl.
*H02M 7/537* (2006.01)
*H02M 5/45* (2006.01)
*H02M 7/487* (2007.01)
*H02M 7/5387* (2007.01)
*H02M 1/32* (2007.01)
*H02M 1/36* (2007.01)

(52) U.S. Cl.
CPC ............ *H02M 7/5387* (2013.01); *H02M 1/32* (2013.01); *H02M 1/36* (2013.01)

(58) Field of Classification Search
CPC .... H02M 7/5381; H02M 1/045; H02M 7/006; H02M 7/06; H02M 7/068; H02M 7/153; H02M 5/45; H02M 3/3155; H02M 3/325; H02M 3/335; H02M 7/537
See application file for complete search history.

(56) References Cited

U.S. PATENT DOCUMENTS

| | | | |
|---|---|---|---|
| 2014/0098587 A1 | 4/2014 | Yatsu | |
| 2014/0132068 A1 | 5/2014 | Maeztu et al. | |
| 2014/0211520 A1* | 7/2014 | Zhang | H02M 1/126 363/37 |
| 2014/0307497 A1 | 10/2014 | Yoo | |
| 2015/0280608 A1* | 10/2015 | Yoscovich | H02M 7/483 363/131 |
| 2015/0333522 A1 | 11/2015 | Wang et al. | |
| 2016/0043659 A1* | 2/2016 | Xu | H02M 7/537 363/131 |
| 2016/0268924 A1 | 9/2016 | Fu et al. | |

FOREIGN PATENT DOCUMENTS

| | | | |
|---|---|---|---|
| CN | 1599233 | A | 3/2005 |
| CN | 1625032 | A | 6/2005 |
| CN | 1832323 | A | 9/2006 |
| CN | 1967997 | A | 5/2007 |
| CN | 101006648 | A | 7/2007 |
| CN | 101022262 | A | 8/2007 |
| CN | 101123413 | A | 2/2008 |
| CN | 101154895 | A | 4/2008 |
| CN | 101174801 | A | 5/2008 |
| CN | 202261005 | U | 5/2012 |
| CN | 102638189 | A | 8/2012 |
| CN | 104104236 | A | 10/2014 |
| CN | 104218832 | A | 12/2014 |
| EP | 2487786 | A2 | 8/2012 |
| EP | 2608387 | A1 | 6/2013 |
| EP | 2816719 | A2 | 12/2014 |
| JP | 2010246189 | A | 10/2010 |
| JP | 2012029384 | A | 2/2012 |
| JP | 2012210066 | A | 10/2012 |
| JP | 2014207853 | A | 10/2014 |

OTHER PUBLICATIONS

Machine Translation and Abstract of Japanese Publication No. JP2012029384, Feb. 9, 2012, 10 pages.
Korhonen, J., et al, "Five-level inverter with a neutral point connection and a flying capacitor," 16th European Conference on Power Electronics and Applications (EPE"14-ECCE Europe), Aug. 26-28, 2014, 7 pages.
Foreign Communication From a Counterpart Application, Chinese Application No. 201510633558.8, Chinese Office Action dated May 25, 2018, 5 pages.
Foreign Communication From a Counterpart Application, Chinese Application No. 201510633558.8, Chinese Search Report dated May 17, 2018, 2 pages.
Machine Translation and Abstract of Chinese Publication No. CN1464627, Dec. 31, 2003, 4 pages.
Machine Translation and Abstract of Chinese Publication No. CN1464631, Dec. 31, 2003, 5 pages.
Machine Translation and Abstract of Chinese Publication No. CN1599233, Mar. 23, 2005, 16 pages.
Machine Translation and Abstract of Chinese Publication No. CN1625032, Jun. 8, 2005, 5 pages.
Machine Translation and Abstract of Chinese Publication No. CN1832323, Sep. 13, 2006, 4 pages.
Machine Translation and Abstract of Chinese Publication No. CN1967997, May 23, 2007, 5 pages.
Machine Translation and Abstract of Chinese Publication No. CN101022262, Aug. 22, 2007, 6 pages.
Machine Translation and Abstract of Chinese Publication No. CN101123413, Feb. 13, 2008, 5 pages.
Machine Translation and Abstract of Chinese Publication No. CN101154895, Apr. 2, 2008, 5 pages.
Machine Translation and Abstract of Chinese Publication No. CN101174801, May 7, 2008, 6 pages.
Machine Translation and Abstract of European Publication No. EP2608387, Jun. 26, 2013, 15 pages.
Foreign Communication From a Counterpart Application, PCT Application No. PCT/CN2016/099893, English Translation of International Search Report dated Dec. 27, 2016, 2 pages.
Foreign Communication From a Counterpart Application, PCT Application No. PCT/CN2016/099893, English Translation of Written Opinion dated Dec. 27, 2016, 3 pages.
Machine Translation and Abstract of Chinese Publication No. CN202261005, May 30, 2012, 6 pages.
Ruderman, A., et al., Tutorial "Time Averaging Methods in PWM Multilevel Power Converters Analysis: Application to Voltage Quality Evaluation and Flying Capacitors Average Voltage Balancing Dynamics," XP031803434, IEEE International Symposium on Industrial Electronics, Jul. 4, 2010, pp. 4468-4531.
Yuan, X., "A New Five-level Converter for Low-Voltage Motor Drive Applications," XP032723034, 17th International Conference on Electrical Machines and Systems, Oct. 22, 2014, pp. 2969-2974.
Foreign Communication From a Counterpart Application, European Application No. 16850304.3, Extended European Search Report dated Jul. 19, 2018, 10 pages.
Machine Translation and Abstract of Chinese Publication No. CN104218832, Dec. 17, 2014, 23 pages.
Machine Translation and Abstract of Japanese Publication No. JP2012210066, Oct. 25, 2012, 19 pages.
Machine Translation and Abstract of Japanese Publication No. JP2014207853, Oct. 30, 2014, 41 pages.
Foreign Communication From a Counterpart Application, Japanese Application No. 2018-535220, Japanese Notice of Allowance dated Nov. 20, 2018, 3 pages.

* cited by examiner

MULTI-LEVEL INVERTER

CROSS-REFERENCE TO RELATED APPLICATIONS

This application is a continuation of International Application No. PCT/CN2016/099893, filed on Sep. 23, 2016, which claims priority to Chinese Patent Application No. 201510633558.8, filed on Sep. 29, 2015, both of which are hereby incorporated by reference in their entireties.

TECHNICAL FIELD

The present disclosure belongs to the field of power source technologies, and specifically, relates to a multi-level inverter.

BACKGROUND

In recent years, renewable energy, in particular, photovoltaic solar energy, has been gaining more attention and has been applied on a large scale in regions such as Europe, North America, and Asia. A typical photovoltaic power generation system converts solar energy into direct current with specific voltage and current by connecting one or more photovoltaic panels in series or in parallel, and then converts the direct current into alternating current using a photovoltaic inverter, and transmits the alternating current to a power grid such that solar energy is converted into energy in the power grid. In an acceptable range of insulation, voltage of direct current output by the panels is generally increased by connecting the panels in series. In this way, larger power can be output in a case of same current (cable diameter), to reduce system costs. Currently, in three-phase grid-connected solar power generation systems that are used on a large scale, maximum voltage output by the serially connected panels is up to 1000 volts (V), and panels whose withstand capacity is 1500 V have been launched. In this case, system costs are expected to be further reduced. However, as voltage output by the panels increases, a higher requirement has been imposed on performance of a switch semiconductor device in a power conversion part of an inverter. Currently, for a mainstream power semiconductor device, switching loss characteristics are relatively good when withstand voltage is less than 1200 V, and relatively ideal conversion efficiency can be achieved in a case of relatively high switching frequency. A size and weight of a filter circuit can be reduced in a case of relatively high switching frequency. This facilitates system miniaturization.

To reduce a size and weight of a filter part of an inverter, multi-level converters that are applied to the high-voltage and high power field have gained great attention in the power electronics industry. Because of a limitation on a voltage capacity of a power electronic device, a conventional bi-level frequency converter usually obtains high voltage and high power in a "high-to-low-to-high" manner by decreasing and increasing voltage using a transformer, or obtains high voltage and high power by connecting multiple small-capacity inverter units in series by means of multiple windings in a multi-winding transformer. This reduces system efficiency and reliability.

SUMMARY

This application provides a multi-level inverter, to output more levels, thereby ensuring system efficiency and reliability.

To achieve the foregoing objective, the following technical solutions are used in embodiments of the present disclosure.

According to a first aspect, a multi-level inverter is provided, including a direct current input unit and an inverter unit, and the multi-level inverter further includes a first bidirectional switch, a second bidirectional switch, and a third capacitor C3, where the direct current input unit includes a first capacitor C1 and a second capacitor C2, and the first capacitor C1 and the second capacitor C2 are connected in series between positive and negative terminals of a direct current input power supply; the inverter unit includes four switching tubes connected in series co-directionally between the positive and negative terminals of the direct current input power supply, where the four switching tubes include a first switching tube Q1, a second switching tube Q2, a third switching tube Q3, and a fourth switching tube Q4, and the four switching tubes are connected in series co-directionally between the positive and negative electrodes of the direct current input power supply in a sequence of Q1, Q2, Q3 and Q4; one terminal of the first bidirectional switch is connected to a connection point between the third switching tube Q3 and the fourth switching tube Q4, and the other terminal of the first bidirectional switch is connected to a connection point between the first capacitor C1 and the second capacitor C2, to implement bidirectional turn-on and turn-off control of current that is between two terminals of the first bidirectional switch; one terminal of the second bidirectional switch is connected to a connection point between the first switching tube Q1 and the second switching tube Q2, and the other terminal of the second bidirectional switch is connected to the connection point between the first capacitor C1 and the second capacitor C2, to implement bidirectional turn-on and turn-off control of current that is between two terminals of the second bidirectional switch; a positive terminal of the third capacitor C3 is connected to the connection point between the first switching tube Q1 and the second switching tube Q2, and a negative terminal of the third capacitor C3 is connected to the connection point between the third switching tube Q3 and the fourth switching tube Q4; and each of the switching tubes Q1 to Q4 is reversely connected in parallel to a diode.

With reference to the first aspect, in a first implementation of the first aspect, the first bidirectional switch includes a fifth switching tube Q5 and a sixth switching tube Q6 that are reversely connected in series, one terminal of the fifth switching tube Q5 is connected to the connection point between the first capacitor C1 and the second capacitor C2, the other terminal of the fifth switching tube Q5 is connected to one terminal of the sixth switching tube Q6, and the other terminal of the sixth switching tube Q6 is connected to the connection point between the third switching tube Q3 and the fourth switching tube Q4.

With reference to the first aspect or the first implementation of the first aspect, in a second implementation of the first aspect, the second bidirectional switch includes a seventh switching tube Q7 and an eighth switching tube Q8 that are reversely connected in series, one terminal of the seventh switching tube Q7 is connected to the connection point between the first capacitor C1 and the second capacitor C2, the other terminal of the seventh switching tube Q7 is connected to one terminal of the eighth switching tube Q8, and the other terminal of the eighth switching tube Q8 is connected to the connection point between the first switching tube Q1 and the second switching tube Q2.

With reference to the first aspect or the first implementation of the first aspect or the second implementation of the first aspect, in a third implementation of the first aspect, each switching tube in either the first bidirectional switch or the second bidirectional switch is reversely connected in parallel to a diode.

With reference to any one of the first aspect or the foregoing three implementations of the first aspect, in a fourth implementation of the first aspect, the multi-level inverter further includes a first switch S1, a second switch S2, and a resistor Rc, where the first switch S1 is connected in parallel to two terminals of the first switching tube Q1, and the second switch S2 is connected in parallel to two terminals of the fourth switching tube Q4 after being connected in series to the resistor Rc.

With reference to any one of the first aspect or the foregoing four implementations of the first aspect, in a fifth implementation of the first aspect, the multi-level inverter further includes a direct current (DC)/DC converter, where two input terminals of the DC/DC converter are respectively connected to two terminals of the direct current input unit, and two output terminals of the DC/DC converter are respectively connected to two terminals of the third capacitor C3.

With reference to any one of the first aspect or the foregoing five implementations of the first aspect, in a sixth implementation of the first aspect, the multi-level inverter further includes a filter unit, where an input terminal of the filter unit is connected to a connection point between the second switching tube Q2 and the third switching tube Q3.

According to a second aspect, an embodiment of the present disclosure provides a power supply system, including a direct current power supply, a DC/DC converter, and the multi-level inverter according to the first aspect, where output terminals of the direct current input power supply like the PV solar panel are connected to input terminals of the DC/DC converter, output terminals of the DC/DC converter are connected to input terminals of the multi-level inverter, and output terminals of the multi-level inverter are connected to a power grid in order to transport, to the power grid, alternating current obtained by the multi-level inverter by means of inversion processing.

According to the multi-level inverter, a designed circuit in which a direct current input unit and an inverter unit are bridged using two groups of bidirectional switches is used to output more levels such that an increased quantity of output voltage levels reduces harmonic content in an output waveform. This improves system efficiency and stability.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
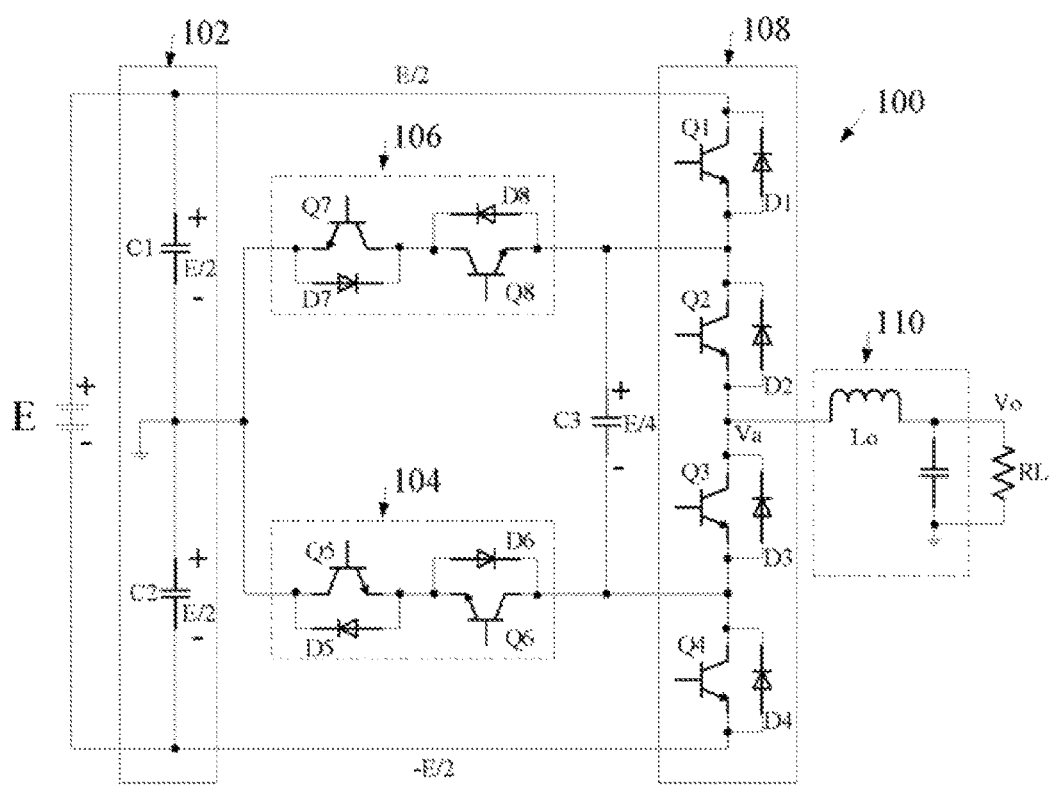
FIG. 1 is a circuit diagram of a multi-level inverter according to Embodiment 1 of the present disclosure.

As shown in FIG. 1, a multi-level inverter 100 provided in this embodiment of the present disclosure may be disposed between a direct current input power supply E and a load RL. Voltage of the direct current input power supply E is E, and the direct current input power supply E may be a solar panel array or an energy storage device such as a rechargeable battery or a fuel cell.

The multi-level inverter 100 includes a direct current input unit 102, a first bidirectional switch 104, a second bidirectional switch 106, a third capacitor C3, and an inverter unit 108, and optionally includes a filter unit 110. The filter unit 110 has an input terminal used for connecting to a node Va and an output terminal used for connecting to a node Vo. The node Vo is used to connect to the load.

The direct current input unit 102 includes two input capacitors that are connected in series, and the two input capacitors include a first capacitor C1 and a second capacitor C2. The first capacitor C1 and the second capacitor C2 are connected in series between two output terminals of the direct current input power supply E. In specific application, the first capacitor C1 and the second capacitor C2 generally have a same capacitance capacity. In this case, direct current voltage applied to the direct current input unit 102 is evenly applied to two terminals of the capacitor C1 and two terminals of the capacitor C2, that is, voltages at the two terminals of the first capacitor C1 are E/2, and voltages at the two terminals of the second capacitor C2 are E/2. Generally, a middle connection point between the first capacitor C1 and the second capacitor C2 is referred to as a neutral point of the multi-level inverter 100. The neutral point is a point with zero voltage. In specific application, the neutral point may be used for grounding.

The inverter unit 108 includes four power switching tubes that are connected in series between the two output terminals of the direct current input power supply E. The four power switching tubes include a first switching tube Q1, a second switching tube Q2, a third switching tube Q3, and a fourth switching tube Q4. The four power switching tubes are connected in series co-directionally between positive and negative electrodes of the direct current input power supply E in a sequence of Q1, Q2, Q3, and Q4, and between every two connected adjacent switching tubes, there is a connection point that connects the two switching tubes.

An input terminal of the filter unit 110 is connected to a connection point between the second switching tube Q2 and the third switching tube Q3, that is, the input terminal of the filter unit 110 is connected to a middle point of a bridge leg formed by the inverter unit 108. The filter unit 110 includes an inductor and a filter capacitor. Two terminals of the inductor are used to respectively connect to the node Va and the node Vo. One terminal of the filter capacitor is connected to the point Vo, and the other terminal of the filter capacitor is grounded. The filter unit 110 may be an LC filter circuit or another filter circuit that is capable of filtering out unnecessary harmonic in a waveform of voltage output from the node Va. The filter unit 110 may be integrated into the multi-level inverter 100 or may be connected externally as a discrete component, and is configured to filter multiple levels output by the inverter unit 108, to form a sinusoidal output waveform.

The inverter unit 108 further includes four diodes. The four diodes are connected in a one-to-one inverse-parallel manner to the four switching tubes Q1 to Q4 respectively, and include a first diode D1, a second diode D2, a third diode D3, and a fourth diode D4. The one-to-one inverse-parallel connection means that the first diode D1 is reversely connected in parallel to two terminals of the first switching tube Q1, the second diode D2 is reversely connected in parallel to two terminals of the second switching tube Q2, the third diode D3 is reversely connected in parallel to two terminals of the third switching tube Q3, and the fourth diode D4 is reversely connected in parallel to two terminals of the fourth switching tube Q4.

The first bidirectional switch 104 includes a fifth switching tube Q5 and a sixth switching tube Q6 that are reversely connected in series. One terminal of the first bidirectional switch 104 is connected to a connection point between the third switching tube Q3 and the fourth switching tube Q4, and the other terminal of the first bidirectional switch 104 is connected to the connection point between the first capacitor C1 and the second capacitor C2.

The second bidirectional switch 106 includes a seventh switching tube Q7 and an eighth switching tube Q8 that are reversely connected in series. One terminal of the second bidirectional switch 106 is connected to a connection point between the first switching tube Q1 and the second switching tube Q2, and the other terminal of the second bidirectional switch 106 is connected to the connection point between the first capacitor C1 and the second capacitor C2.

Switching tubes of each bidirectional switch that are connected in series each are connected to one diode in a one-to-one inverse-parallel manner. For example, the fifth switching tube Q5 is reversely connected in parallel to a fifth diode D5 correspondingly, the sixth switching tube Q6 is reversely connected in parallel to a sixth diode D6 correspondingly, the seventh switching tube Q7 is reversely connected in parallel to a seventh diode D7 correspondingly, and the eighth switching tube Q8 is reversely connected in parallel to an eighth diode D8 correspondingly.

The first or second bidirectional switching 104/106 is formed by two unidirectional switching tubes connected in series. As shown in FIG. 1, an arrow of any one of the switching tubes Q1 to Q8 in FIG. 1 indicates a direction of current whose turn-on and turn-off can be controlled by the switching tube, and the switching tube is turned off in a direction opposite to a direction of the arrow. In addition, for preventing the switching tube from being broken down at overvoltage in a reverse direction, a diode is reversely connected in parallel to two terminals of each switching tube. The inverse-parallel connection means that an arrow direction indicating turn-on of the switching tube is opposite to a direction for turn-on of the diode. It can be learned that a bidirectional switch capable of implementing bidirectional turn-on and turn-off control may include two unidirectional switching tubes reversely connected in series and two diodes reversely connected in parallel to the two switching tubes, and breakdown at overvoltage in a reverse direction is avoided.

A positive terminal of the third capacitor C3 is connected to the connection point between the first switching tube Q1 and the second switching tube Q2, and a negative terminal of the third capacitor C3 is connected to the connection point between the third switching tube Q3 and the fourth switching tube Q4. In specific application, a difference between voltage at the two terminals of the C3 generally equals E/4.

For the multi-level inverter 100, in specific application, control signals for the second switching tube Q2 and the third switching tube Q3 are complementary, control signals for the first switching tube Q1 and the sixth switching tube Q6 are complementary, control signals for the fourth switching tube Q4 and the eighth switching tube Q8 are complementary, and control signals for the fifth switching tube Q5 and the seventh switching tube Q7 are complementary. The node Va can output five levels of voltage, including E/2, E/4, 0, −E/4, and −E/2 by controlling switching statuses of the switching tubes Q1 to Q8. That the signals are complementary means that the control signals are contrary. For example, that the control signals for the second switching tube Q2 and the third switching tube Q3 are complementary means that a control signal for the third switching tube Q3 is turn-off when a control signal for the second switching tube Q2 is turn-on. The control signals may be applied to a gate electrode (base) of each switching tube.

The following describes control and output principles of the multi-level inverter 100. Logic 1 represents turn-on of a switching tube, logic 0 represents turn-off of a switching tube. That control signals for two switching tubes are complementary means that logic of two control signals output to the two switching tubes is [0,1] or [1,0]. Output voltage on the node Va corresponding to different switching states is shown in Table 1 below.

TABLE 1

| Output voltage Va on a node Va | Switching status | Status of a switching tube (1 represents turn-on, and 0 represents turn-off) | | | | | | | |
|---|---|---|---|---|---|---|---|---|---|
| | | Q1 | Q2 | Q3 | Q4 | Q5 | Q6 | Q7 | Q8 |
| E/2 | State 0 | 1 | 1 | 0 | 0 | 1 | 0 | 0 | 1 |
| E/4 | State 1 | 1 | 0 | 1 | 0 | 1 | 0 | 0 | 1 |
| | State 2 | 0 | 1 | 0 | 0 | 1 | 1 | 0 | 1 |
| 0 | State 1 | 0 | 0 | 1 | 0 | 1 | 1 | 0 | 1 |
| | State 2 | 0 | 1 | 0 | 0 | 0 | 1 | 1 | 1 |
| −E/4 | State 2 | 0 | 0 | 1 | 0 | 0 | 1 | 1 | 1 |
| | State 1 | 0 | 1 | 0 | 1 | 0 | 1 | 1 | 0 |
| −E/2 | State 0 | 0 | 0 | 1 | 1 | 0 | 1 | 1 | 0 |

As shown in Table 1, different voltage is output from the node Va by controlling turn-on and turn-off of the switching tubes Q1 to Q8. For voltage output at five levels in the table, the switching tubes are in one or two states, 0 represents turn-off, and 1 represents turn-on. State 0 (Mode 0) in the table indicates a mode in which the third capacitor C3 is not in a charging or discharging state, state 1 (Mode 1) indicates a mode in which the third capacitor C3 is in a discharging state, and state 2 (Mode 2) indicates a mode in which the third capacitor C3 is in a charging state. A current switching state may be chosen according to a previous switching state. That is, if the previous switching state corresponds to the charging state of the third capacitor C3, a switching state corresponding to the discharging state of the third capacitor C3 may be selected as the current switching state, and so on.

A column corresponding to a switching tube in Table 1.1 or Table 1.2 indicates turn-on and turn-off control states of the switching tube in a grid frequency period.

TABLE 1.1

| Output voltage Va on a node Va | Switching status | Status of a switching tube (1 represents turn-on, and 0 represents turn-off) | | | | | | | |
|---|---|---|---|---|---|---|---|---|---|
| | | Q1 | Q2 | Q3 | Q4 | Q5 | Q6 | Q7 | Q8 |
| E/2 | State 0 | 1 | 1 | 0 | 0 | 1 | 0 | 0 | 1 |
| E/4 | State 1 | 1 | 0 | 1 | 0 | 1 | 0 | 0 | 1 |
| 0 | State 2 | 0 | 1 | 0 | 0 | 0 | 1 | 1 | 1 |
| −E/4 | State 1 | 0 | 1 | 0 | 1 | 0 | 1 | 1 | 0 |
| −E/2 | State 0 | 0 | 0 | 1 | 1 | 0 | 1 | 1 | 0 |

TABLE 1.2

| Output voltage Va on a node Va | Switching status | Status of a switching tube (1 represents turn-on, and 0 represents turn-off) | | | | | | | |
|---|---|---|---|---|---|---|---|---|---|
| | | Q1 | Q2 | Q3 | Q4 | Q5 | Q6 | Q7 | Q8 |
| E/2 | State 0 | 1 | 1 | 0 | 0 | 1 | 0 | 0 | 1 |
| E/4 | State 2 | 0 | 1 | 0 | 0 | 1 | 1 | 0 | 1 |
| 0 | State 1 | 0 | 0 | 1 | 0 | 1 | 1 | 0 | 1 |
| −E/4 | State 2 | 0 | 0 | 1 | 0 | 0 | 1 | 1 | 1 |
| −E/2 | State 0 | 0 | 0 | 1 | 1 | 0 | 1 | 1 | 0 |

In addition, when the load is a general resistor or a power consuming device, the multi-level inverter 100 maintains positive work output, and both output current and output voltage are greater than 0. When the load is a power grid, a sinusoidal voltage or current transmission manner is used in the power grid, and phases are different at different moments. Therefore, two states, namely, active output and reactive output, need to be further included in each voltage output state of the multi-level inverter 100. Output current i is greater than 0 for the active output, and the output current i is less than 0 for the reactive output.

Specific control logic of output of each voltage is described as follows.

Figure 2A:
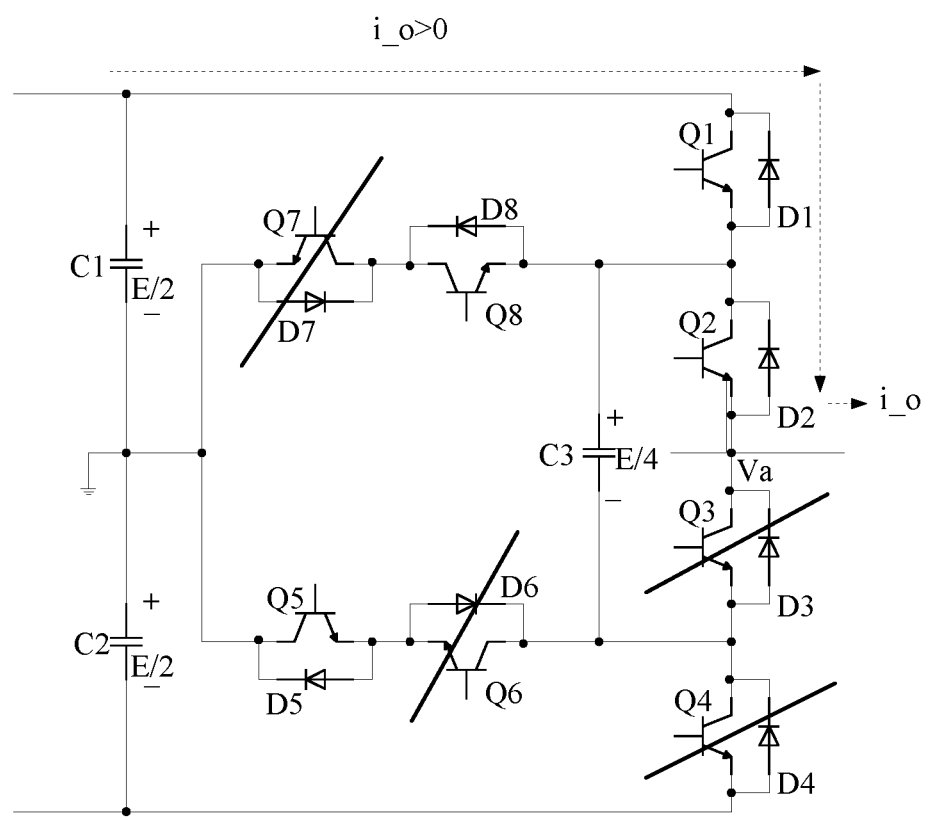
FIG. 2A and FIG. 2B are circuit control diagrams of a multi-level inverter in a state 1 according to Embodiment 1 of the present disclosure.
Figure 2B:
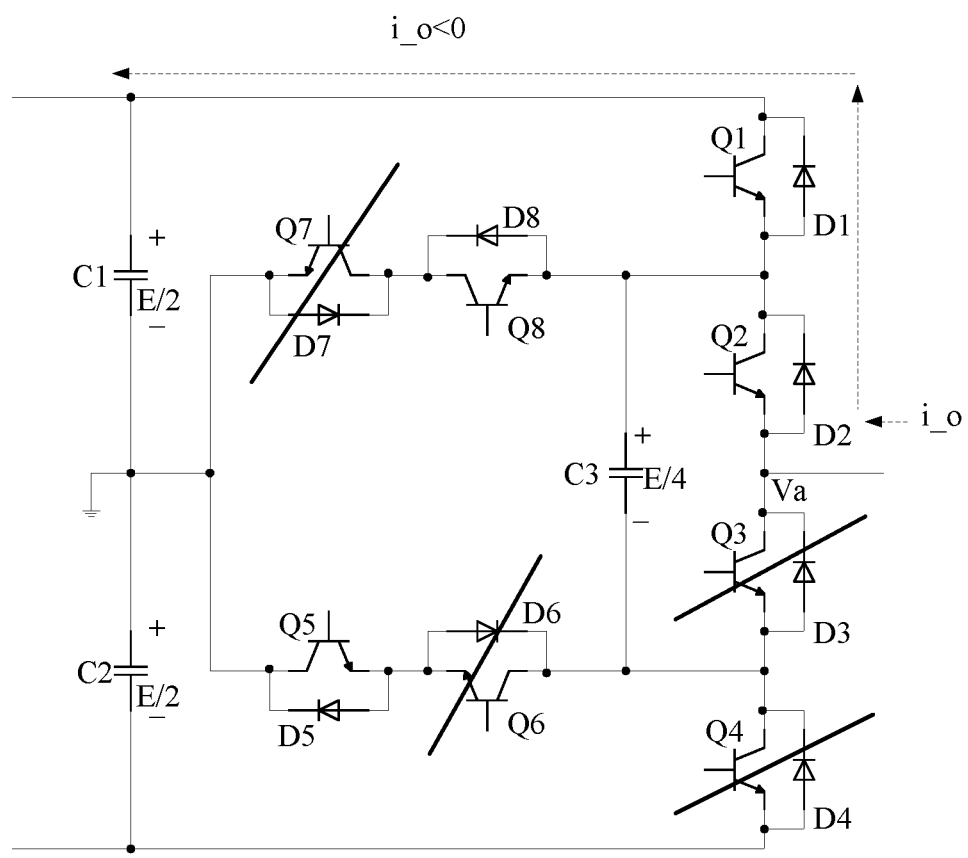

(1) Refer to Table 1, FIG. 2A, and FIG. 2B when voltage on the node Va is E/2.

TABLE 2

| Va | Status | Switching tube | | | | | | | |
|---|---|---|---|---|---|---|---|---|---|
| | | Q1 | Q2 | Q3 | Q4 | Q5 | Q6 | Q7 | Q8 |
| E/2 | Mode 0 | 1 | 1 | 0 | 0 | 1 | 0 | 0 | 1 |
| | Withstand voltage | 0 | 0 | E/4 | 3E/4 | 0 | E/4 | E/2 | 0 |

Referring to Table 1, FIG. 2A, and FIG. 2B, a slash on a switching tube in FIG. 2A and FIG. 2B represents turn-off, that is, the switching tubes Q1, Q2, Q5, and Q8 are turned on, and the switching tubes Q3, Q4, Q6, and Q7 are turned off. At this time, both the two bidirectional switching tubes 104 and 106 are turned off, and both the third switching tube Q3 and the fourth switching tube Q4 are turned off such that both the third capacitor C3 and the second capacitor C2 are turned off and are unable to generate voltage for the node Va. Therefore, output voltage on the node Va is E/2 in this case. Voltage output at another level is based on a same principle that voltage output is adjusted by means of turn-on and turn-off of a switching tube. For a specific control principle, details are not described below again.

Figure 3A:
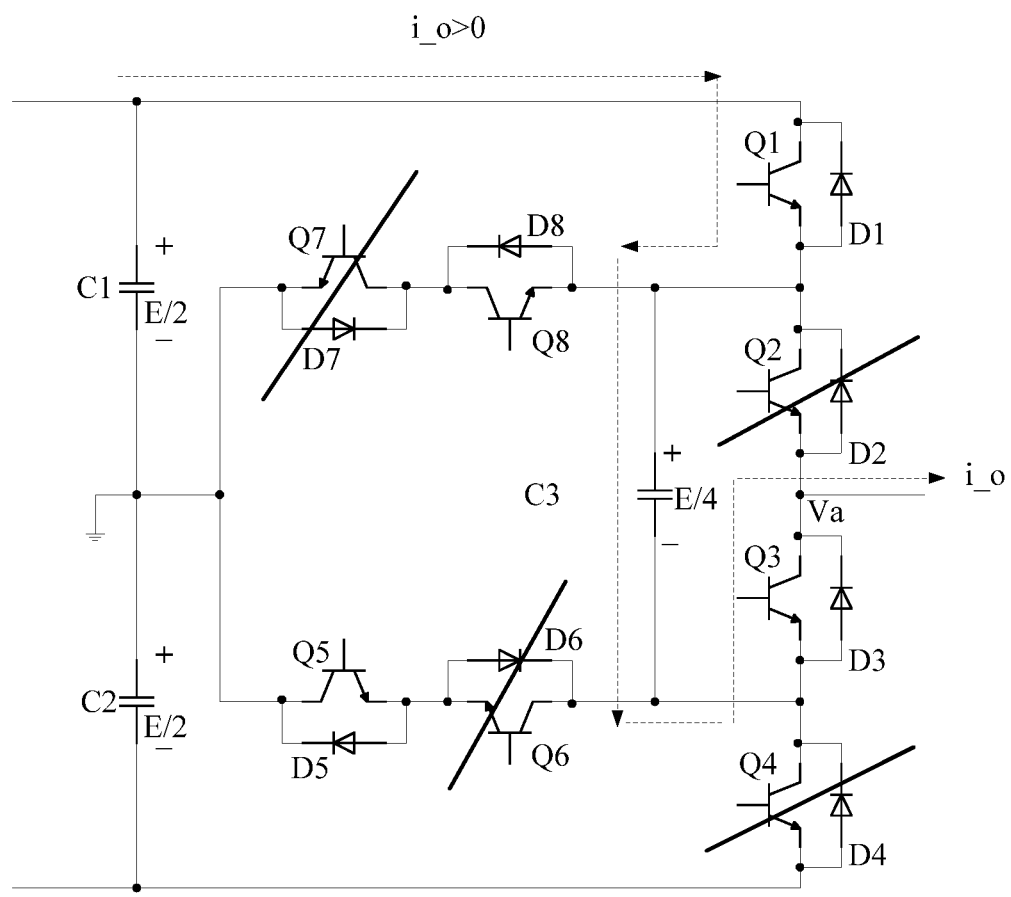
FIG. 3A and FIG. 3B are circuit control diagrams of a multi-level inverter in a state 2 according to Embodiment 1 of the present disclosure.
Figure 3B:
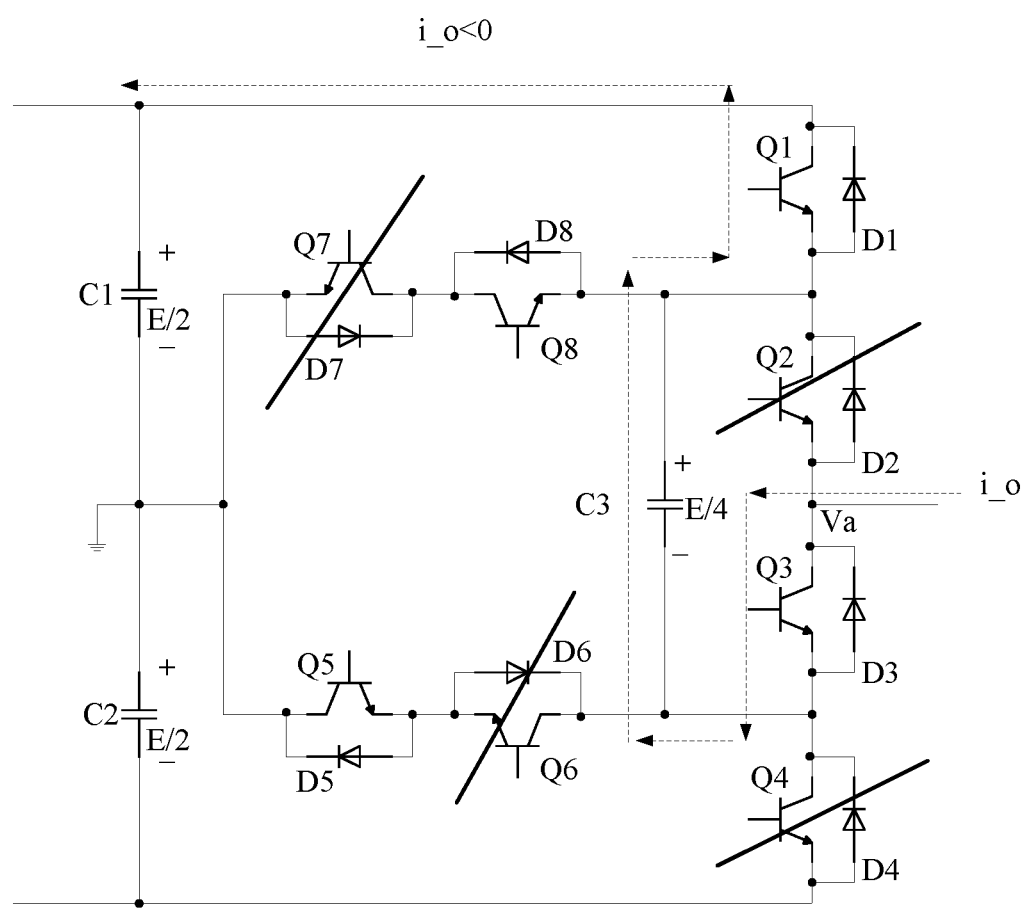

(2) Refer to Table 3, FIG. 3A, and FIG. 3B when voltage on the node Va is E/4 and a state is Mode 1.

TABLE 3

| Va | Status | Switching tube | | | | | | | |
|---|---|---|---|---|---|---|---|---|---|
| | | Q1 | Q2 | Q3 | Q4 | Q5 | Q6 | Q7 | Q8 |
| E/4 | Mode 1 | 1 | 0 | 1 | 0 | 1 | 0 | 0 | 1 |
| | Withstand voltage | 0 | E/4 | 0 | 3E/4 | 0 | E/4 | E/2 | 0 |

Figure 4A:
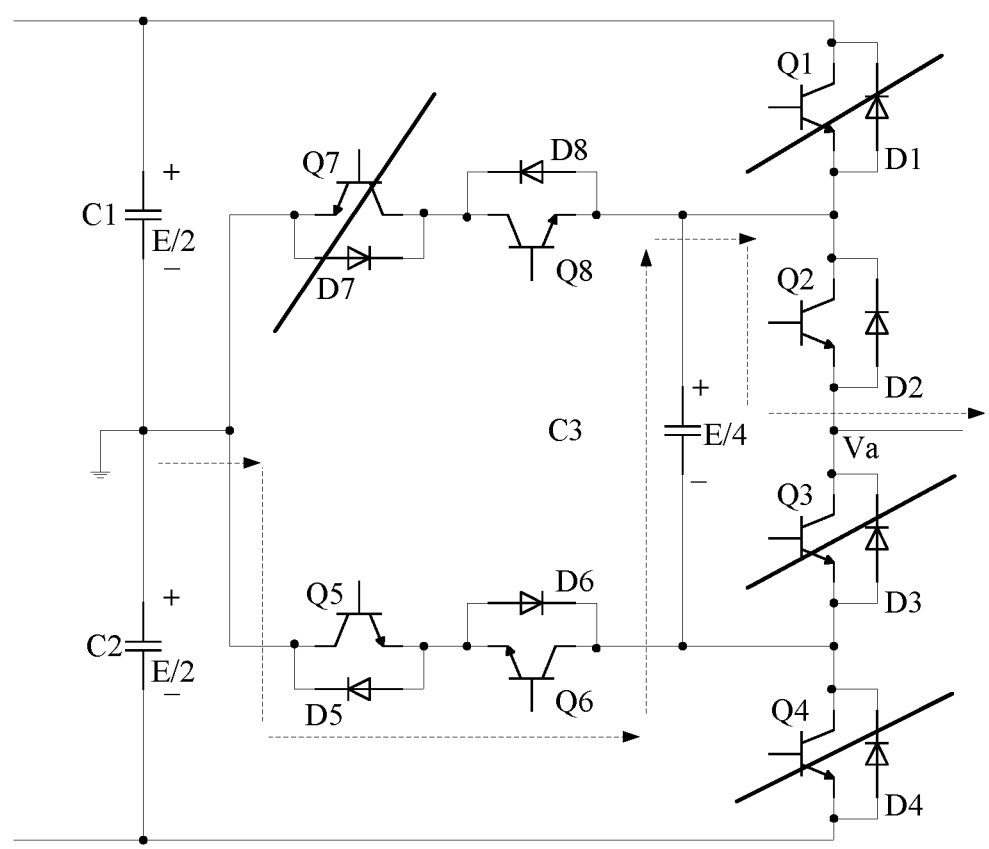
FIG. 4A and FIG. 4B are circuit control diagrams of a multi-level inverter in a state 3 according to Embodiment 1 of the present disclosure.
Figure 4B:
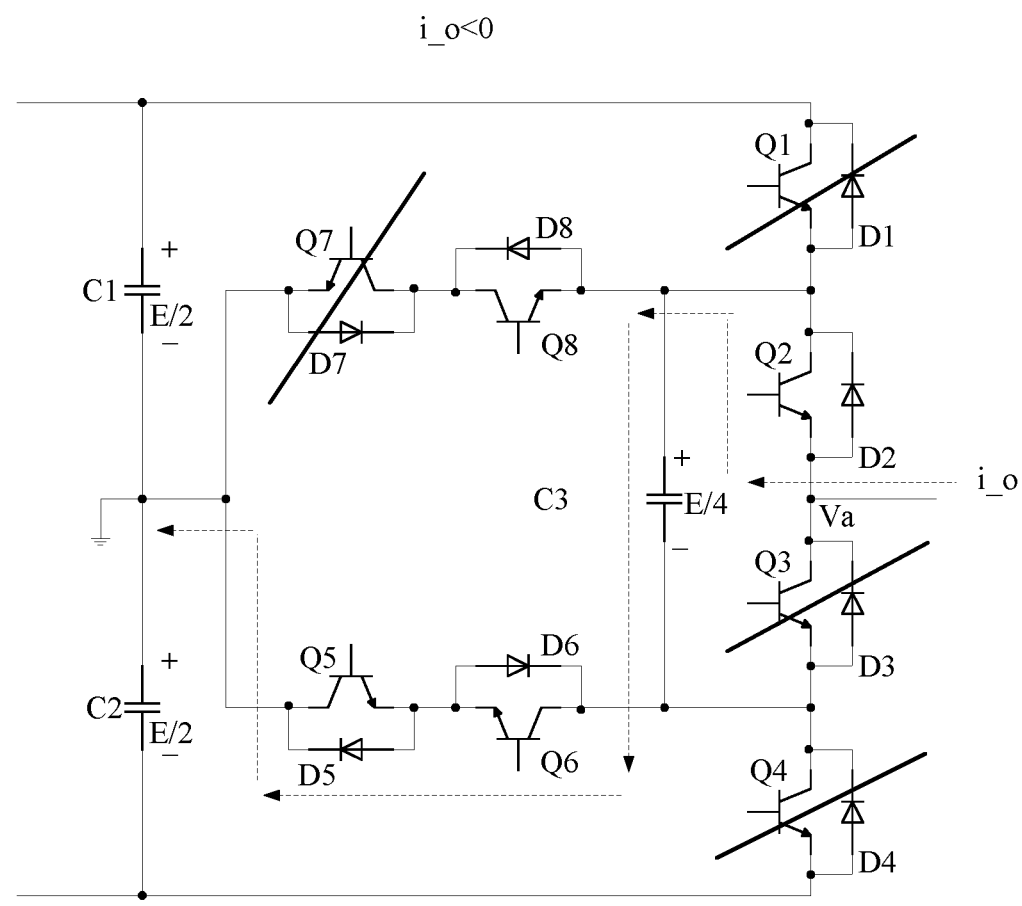

(3) Refer to Table 4, FIG. 4A, and FIG. 4B when a voltage on the node Va is E/4 and a state is Mode 2.

TABLE 4

| Va | Status | Switching tube | | | | | | | |
|---|---|---|---|---|---|---|---|---|---|
| | | Q1 | Q2 | Q3 | Q4 | Q5 | Q6 | Q7 | Q8 |
| E/4 | Mode 2 | 0 | 1 | 0 | 0 | 1 | 1 | 0 | 1 |
| | Withstand voltage | E/2 | 0 | E/2 | E/2 | 0 | 0 | E/4 | 0 |

It should be additionally noted that it can be learned from FIG. 4A and FIG. 4B that when i_o>0 or i_o<0, the third capacitor C3 is respectively in a charging state and a discharging state in two switching modes: Mode 1 and Mode 2. That is, regardless of a state of the current i_o, when the voltage output on the node Va is maintained at E/4, the charging and discharging states of the third capacitor C3 can be controlled by adjusting a state of the switching tube, and the voltage at two terminals of the C3 is further controlled and maintained at E/4 such that maximum withstand voltage of the second switching tube Q2 and the third switching tube Q3 is E/4. That is, when the multi-level inverter 100 outputs a maximum of 1500 V, withstand voltage of the second switching tube Q2 and the third switching tube Q3 is less than 600 V, and a switching tube with optimal performance, most model options, and withstand voltage of 600 V may be used. In this way, costs can be reduced and performance can be ensured. In the following described scenarios of voltage output in the two modes: Mode 1 and Mode 2, the two switching modes: Mode 1 and Mode 2 are respectively corresponding to the discharging and charging states of the third capacitor C3, and the voltage of the third capacitor C3 is maintained at E/4. Details are not described below again.

Figure 5A:
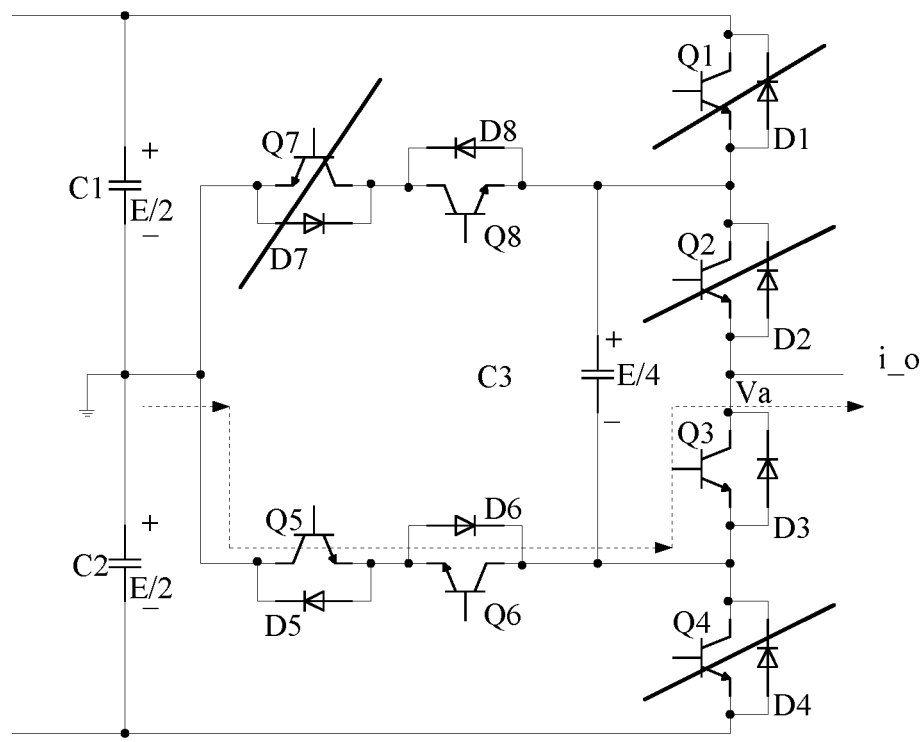
FIG. 5A and FIG. 5B are circuit control diagrams of a multi-level inverter in a state 4 according to Embodiment 1 of the present disclosure.
Figure 5B:
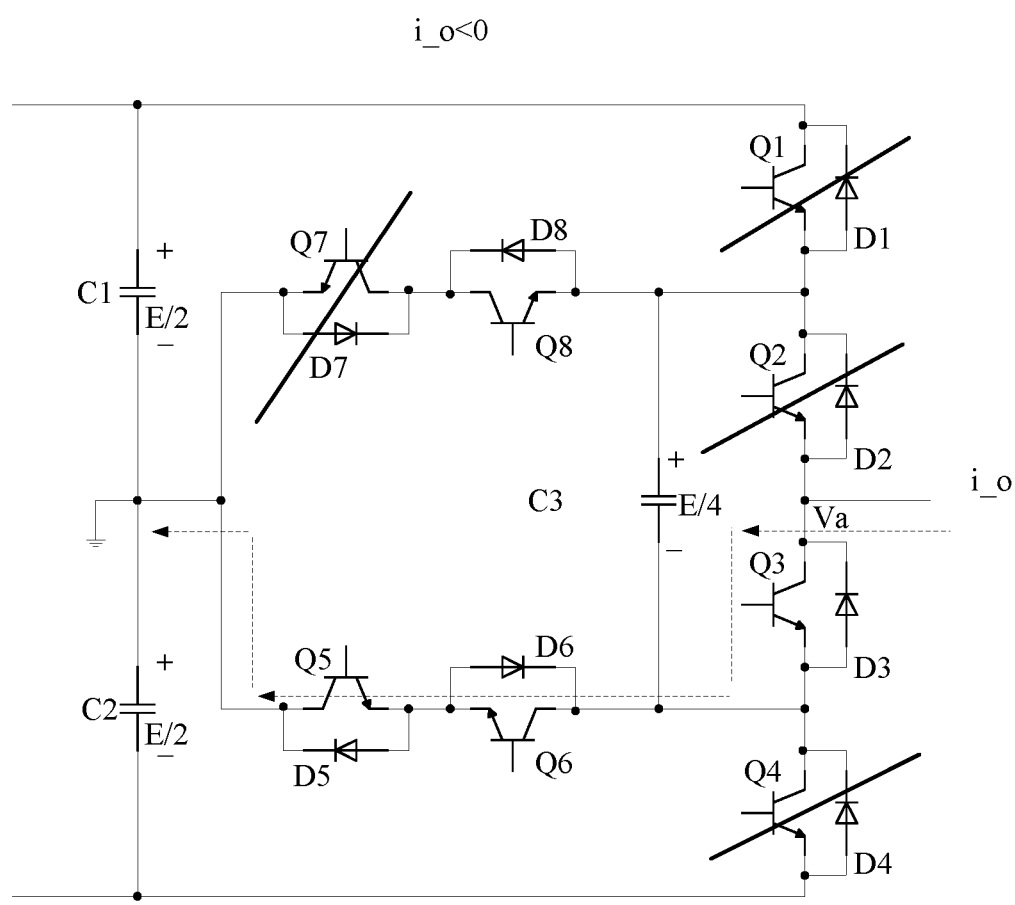

(4) Refer to Table 5, FIG. 5A, and FIG. 5B when voltage on the node Va is 0 and a state is Mode 1.

TABLE 5

| | | Switching tube | | | | | | | |
|---|---|---|---|---|---|---|---|---|---|
| Va | Status | Q1 | Q2 | Q3 | Q4 | Q5 | Q6 | Q7 | Q8 |
| 0 | Mode 1 | 0 | 0 | 1 | 0 | 1 | 1 | 0 | 1 |
| | Withstand voltage | E/4 | E/4 | 0 | E/2 | 0 | 0 | E/4 | 0 |

Figure 6A:
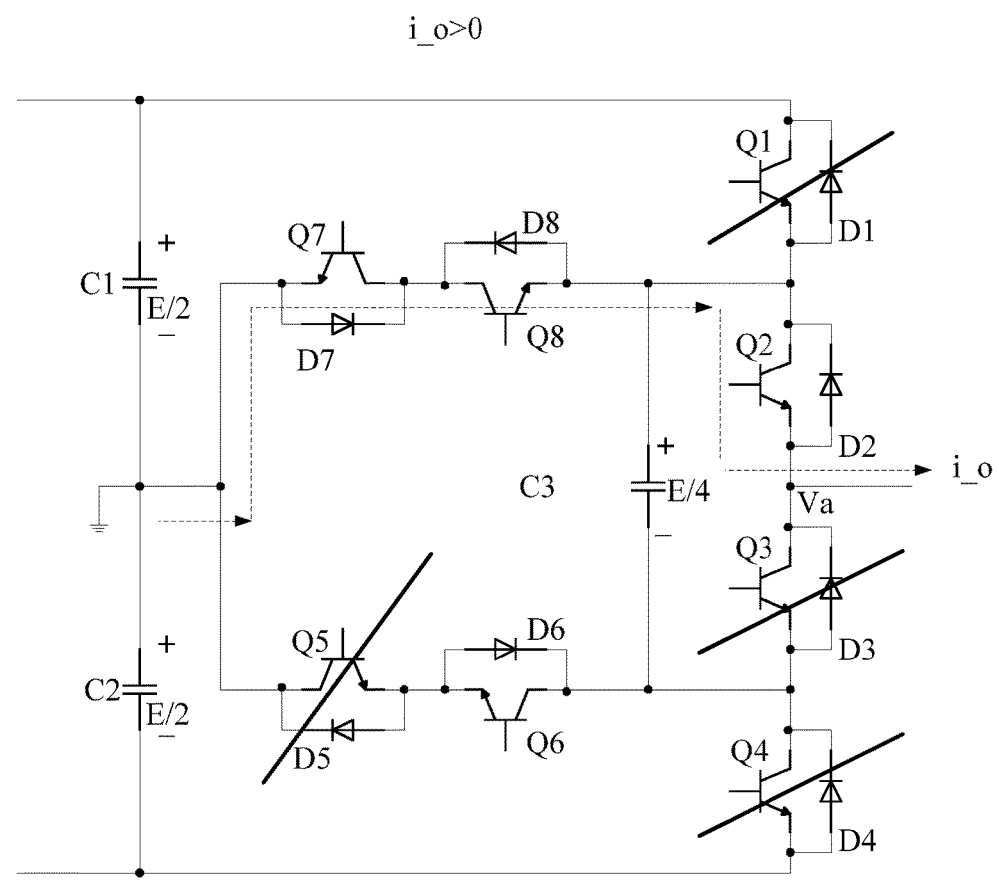
FIG. 6A and FIG. 6B are circuit control diagrams of a multi-level inverter in a state 5 according to Embodiment 1 of the present disclosure.
Figure 6B:
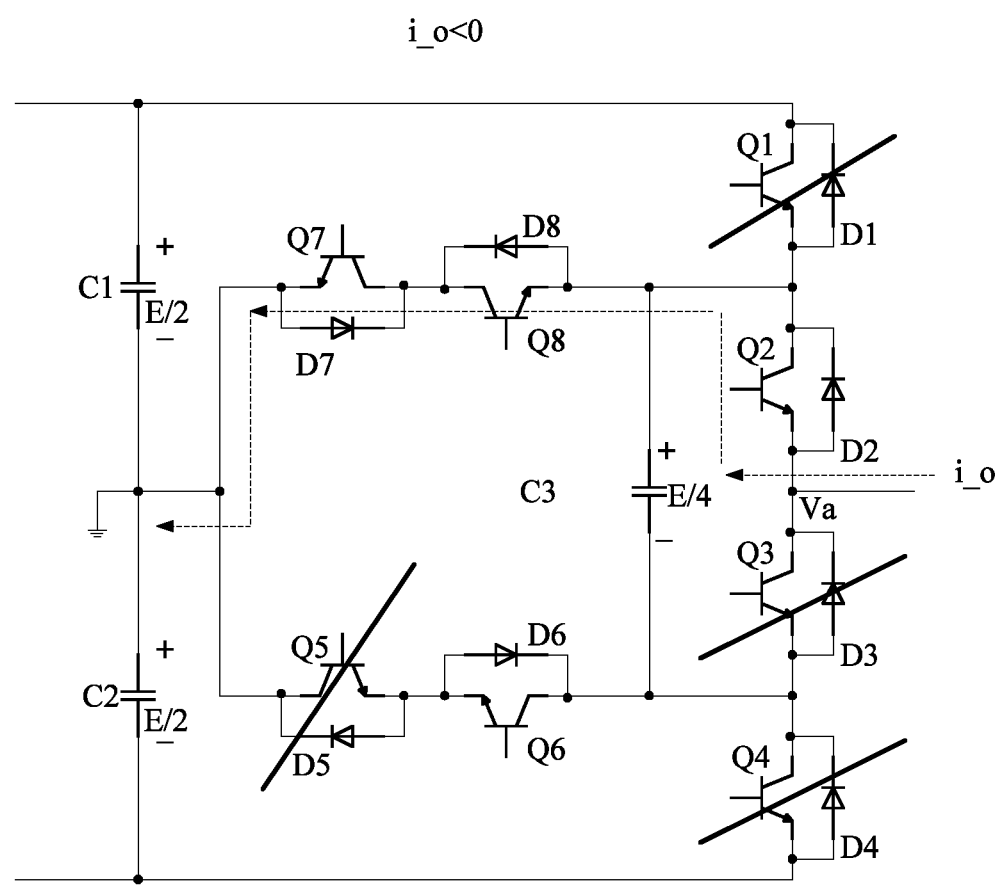

(5) Refer to Table 6, FIG. 6A, and FIG. 6B when voltage on the node Va is 0 and a state is Mode 2.

TABLE 6

| | | Switching tube | | | | | | | |
|---|---|---|---|---|---|---|---|---|---|
| Va | Status | Q1 | Q2 | Q3 | Q4 | Q5 | Q6 | Q7 | Q8 |
| 0 | Mode 2 | 0 | 1 | 0 | 0 | 0 | 1 | 1 | 1 |
| | Withstand voltage | E/2 | 0 | E/4 | E/4 | E/4 | 0 | 0 | 0 |

Figure 7A:
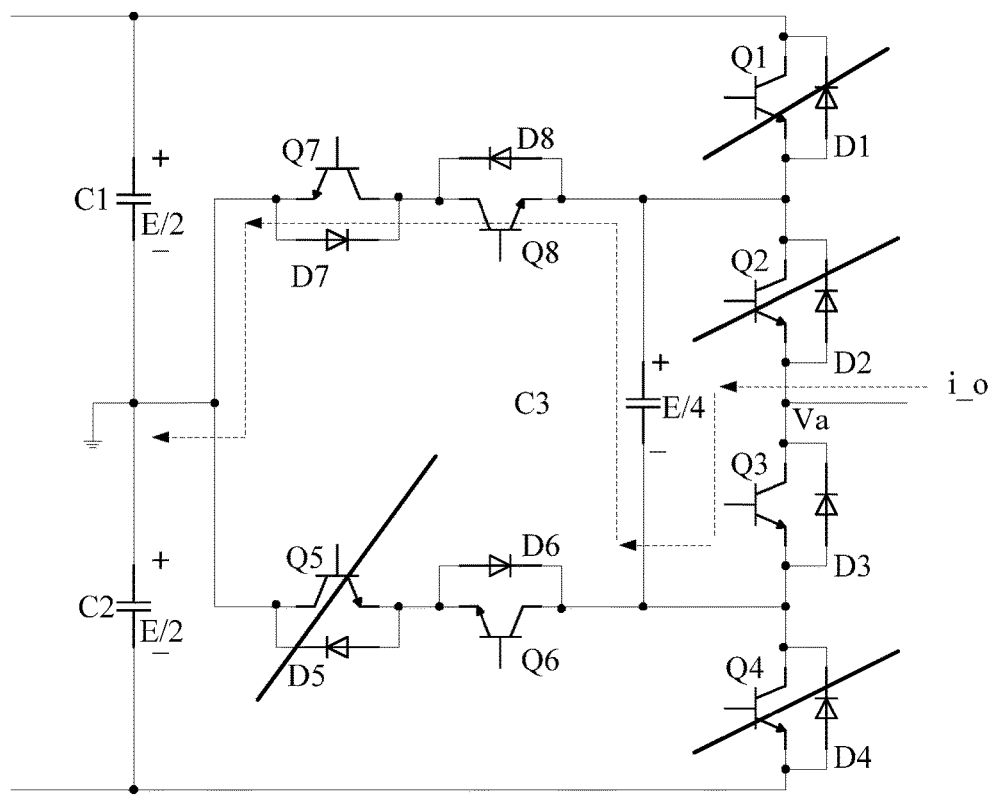
FIG. 7A and FIG. 7B are circuit control diagrams of a multi-level inverter in a state 6 according to Embodiment 1 of the present disclosure.
Figure 7B:
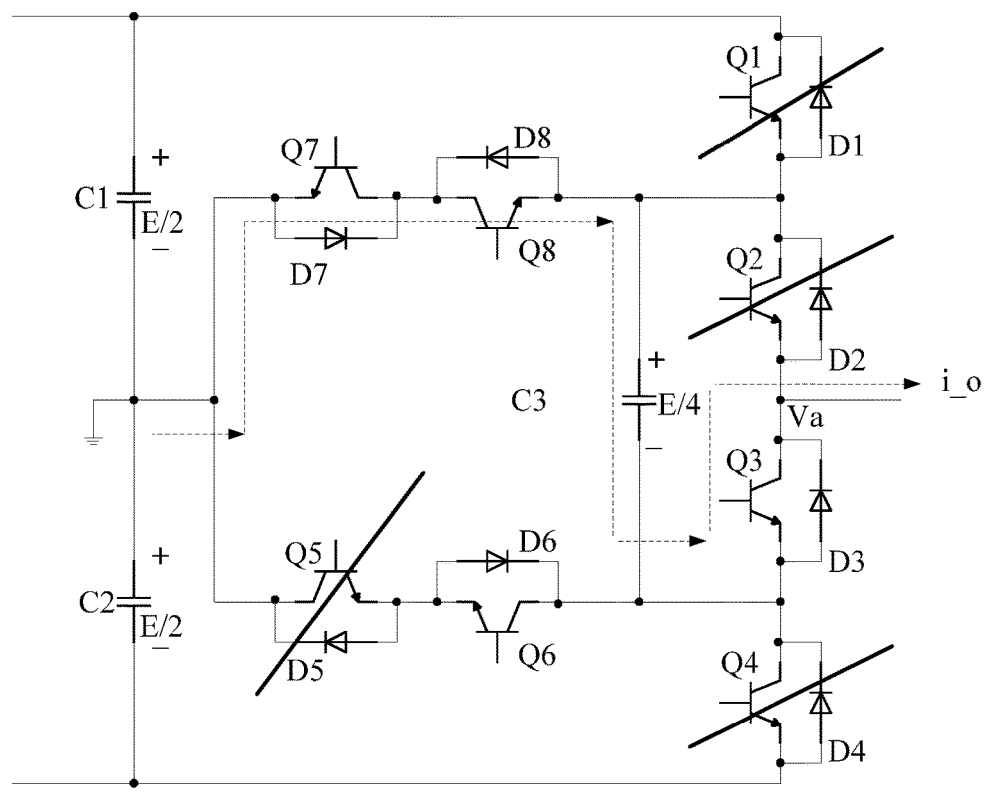

(6) Refer to Table 7, FIG. 7A, and FIG. 7B when voltage on the node Va is $-E/4$ and a state is Mode 1.

TABLE 7

| | | Switching tube | | | | | | | |
|---|---|---|---|---|---|---|---|---|---|
| Va | Status | Q1 | Q2 | Q3 | Q4 | Q5 | Q6 | Q7 | Q8 |
| $-E/4$ | Mode 1 | 0 | 0 | 1 | 0 | 0 | 1 | 1 | 1 |
| | Withstand voltage | E/2 | E/4 | 0 | E/4 | E/4 | 0 | 0 | 0 |

Figure 8A:
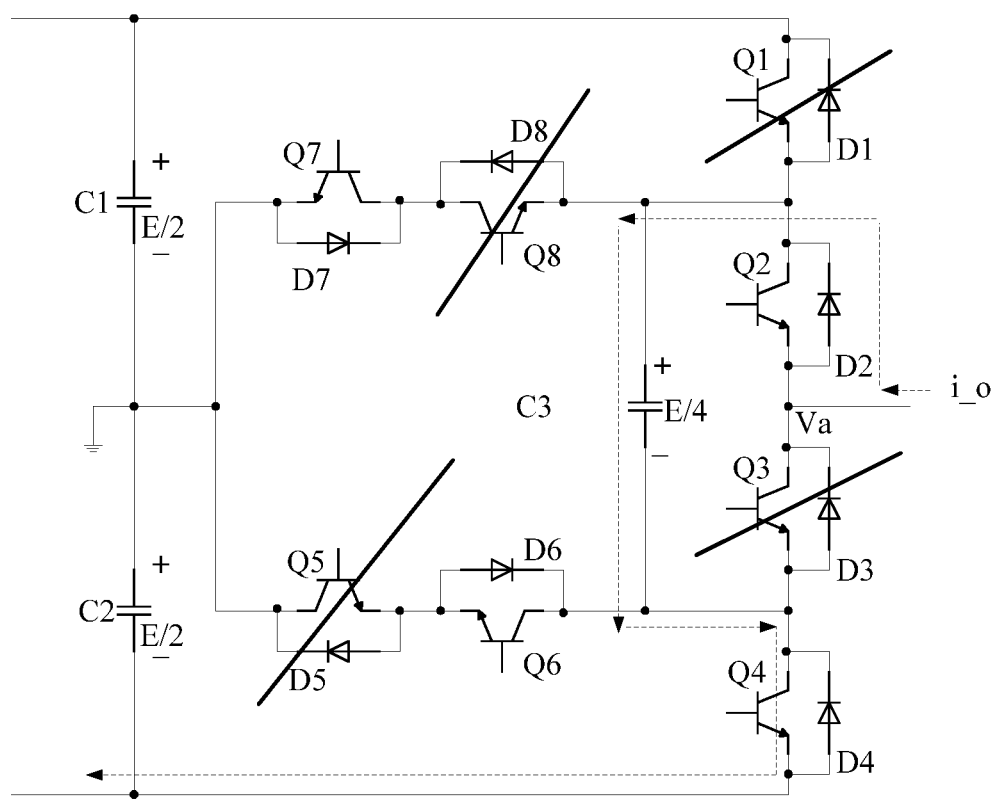
FIG. 8A and FIG. 8B are circuit control diagrams of a multi-level inverter in a state 7 according to Embodiment 1 of the present disclosure.
Figure 8B:
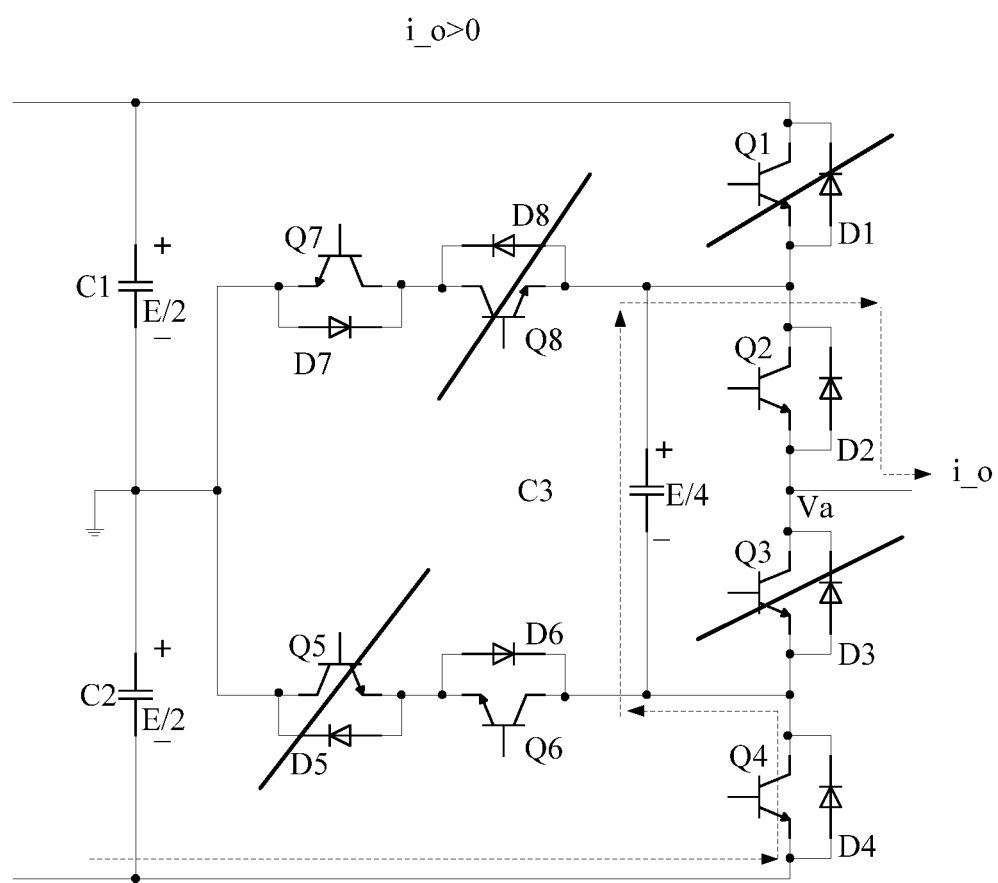

(7) Refer to Table 8, FIG. 8A, and FIG. 8B when voltage on the node Va is $-E/4$ and a state is Mode 2.

TABLE 8

| | | Switching tube | | | | | | | |
|---|---|---|---|---|---|---|---|---|---|
| Va | Status | Q1 | Q2 | Q3 | Q4 | Q5 | Q6 | Q7 | Q8 |
| $-E/4$ | Mode 2 | 0 | 1 | 0 | 1 | 0 | 1 | 1 | 0 |
| | Withstand voltage | 3E/4 | 0 | E/4 | 0 | E/2 | 0 | 0 | E/4 |

Figure 9A:
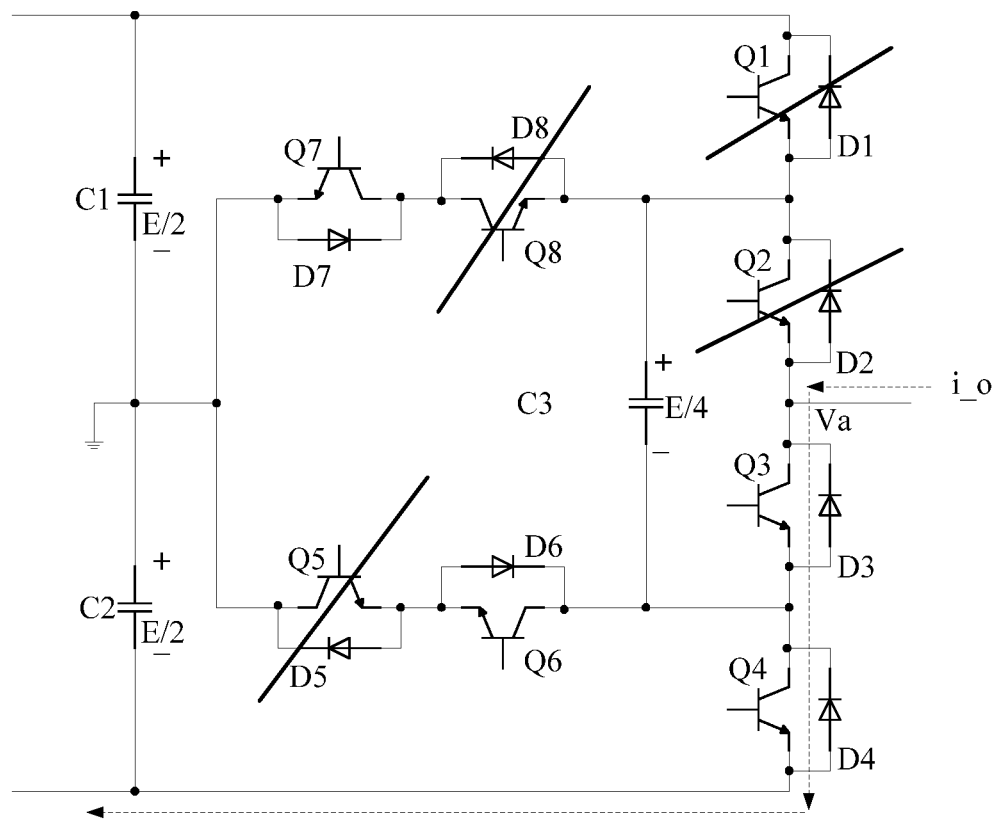
FIG. 9A and FIG. 9B are circuit control diagrams of a multi-level inverter in a state 8 according to Embodiment 1 of the present disclosure.
Figure 9B:
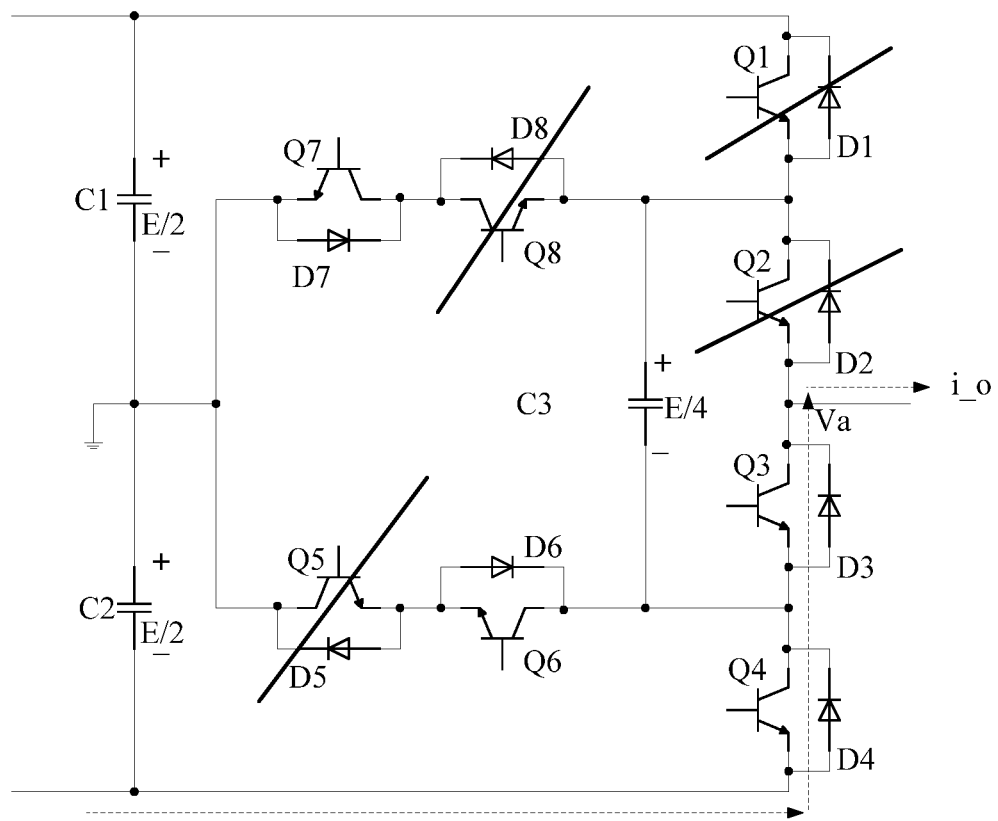

(8) Refer to Table 9, FIG. 9A, and FIG. 9B when voltage on the node Va is $-E/2$.

TABLE 9

| | | Switching tube | | | | | | | |
|---|---|---|---|---|---|---|---|---|---|
| Va | Status | Q1 | Q2 | Q3 | Q4 | Q5 | Q6 | Q7 | Q8 |
| $-E/2$ | Mode | 0 | 0 | 1 | 1 | 0 | 1 | 1 | 0 |
| | Withstand voltage | 3E/4 | E/4 | 0 | 0 | E/2 | 0 | 0 | E/4 |

Based on the foregoing various level output statuses, switching states of the multi-level inverter 100 and stress withstanding statuses of all switching tubes are summarized as follows.

TABLE 10

| | | Switching status | | | | | | | | Stress status | | | | | | | |
|---|---|---|---|---|---|---|---|---|---|---|---|---|---|---|---|---|---|
| Va | Mode | Q1 | Q2 | Q3 | Q4 | Q5 | Q6 | Q7 | Q8 | Q1 | Q2 | Q3 | Q4 | Q5 | Q6 | Q7 | Q8 |
| E/2 | Mode 1 | 1 | 1 | 0 | 0 | 1 | 0 | 0 | 1 | 0 | 0 | E/4 | 3E/4 | 0 | E/4 | E/2 | 0 |
| E/4 | Mode 1 | 1 | 0 | 1 | 0 | 1 | 0 | 0 | 1 | 0 | E/4 | 0 | 3E/4 | 0 | E/4 | E/2 | 0 |
| | Mode 2 | 0 | 1 | 0 | 0 | 1 | 1 | 0 | 1 | E/4 | 0 | E/4 | E/2 | 0 | 0 | E/4 | 0 |
| 0 | Mode 1 | 0 | 0 | 1 | 0 | 1 | 1 | 0 | 1 | E/4 | E/4 | 0 | E/2 | 0 | 0 | E/4 | 0 |
| | Mode 2 | 0 | 1 | 0 | 0 | 0 | 1 | 1 | 1 | E/2 | 0 | E/4 | E/4 | E/4 | 0 | 0 | 0 |
| $-E/4$ | Mode 1 | 0 | 0 | 1 | 0 | 0 | 1 | 1 | 1 | E/2 | E/4 | 0 | E/4 | E/4 | 0 | 0 | 0 |
| | Mode 2 | 0 | 1 | 0 | 1 | 0 | 1 | 1 | 0 | 3E/4 | 0 | E/4 | 0 | E/2 | 0 | 0 | E/4 |
| $-E/2$ | Mode 1 | 0 | 0 | 1 | 1 | 0 | 1 | 1 | 0 | 3E/4 | E/4 | 0 | 0 | E/2 | 0 | 0 | E/4 |

It can be learned from the foregoing various scenarios and a summary in Table 10 that withstand voltage of the four switching tubes Q2, Q3, Q6, and Q8 of the multi-level converter 100 is E/4 while maximum withstand voltage of the other four switching tubes Q1, Q4, Q5, and Q7 is 3E/4. For a 1500 V system, a semiconductor switching device with withstand voltage of 600 V is chosen for the four switching tubes Q2, Q3, Q6, and Q8 while a semiconductor switching device with withstand voltage of 1200 V may be chosen for the other four switching tubes Q1, Q4, Q5, and Q7. In this way, with a designed circuit in which the direct current input unit 102 and the inverter unit 108 are bridged using two groups of bidirectional switches, the multi-level inverter 100 only needs to use a combination, of a 600 V switching tube and a 1200 V switching tube, that has relatively excellent performance, to implement inversion and conversion of a 1500 V direct current system, and also output five levels.

Embodiment 2

Figure 10:
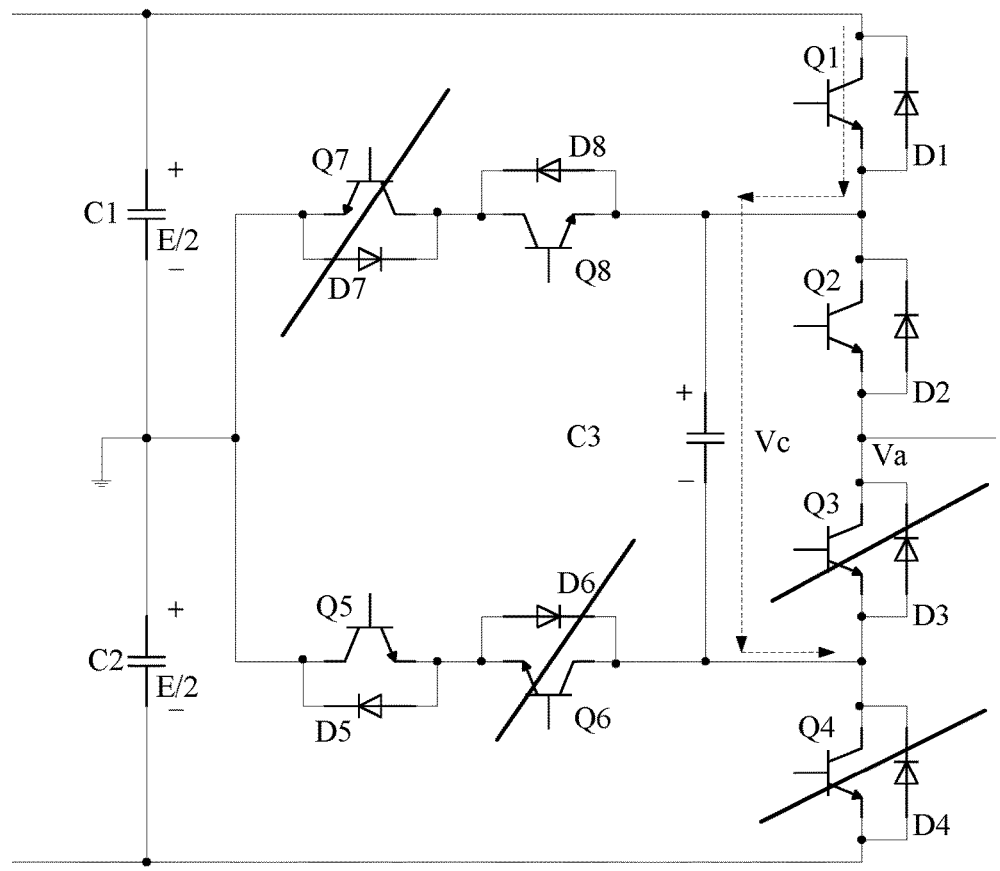
FIG. 10 is a circuit control state diagram of a multi-level inverter according to Embodiment 1 of the present disclosure.

Because of presence of the third capacitor C3, when a system starts to work, for preventing a third switching tube Q3 and a fourth switching tube Q4 from withstanding an overvoltage, two terminals of the third capacitor C3 need to be pre-charged. As shown in FIG. 10, when all switching tubes in a system are closed, there is no path, and as a result, there is no charge in the third capacitor C3. It can be considered that voltage Vc at the two terminals of the third capacitor C3 is extremely low and close to 0. In this case, if a state in which E/2 is output is required for Va, a first switching tube Q1 and a second switching tube Q2 are turned on, the third switching tube Q3 and the fourth switching tube Q4 are turned off, and capacitance and voltage cannot change suddenly, that is, Vc is close to 0. Then, input voltage passes through the first switching tube Q1 and the third capacitor C3 (Vc=0) and is directly applied to two terminals of the fourth switching tube Q4. In this case, the fourth switching tube Q4 withstands voltage of an entire direct current input power supply E which exceeds 3E/4 described above, and this causes an overvoltage damage to the fourth switching tube Q4. For avoiding this problem, before a switching action is performed, the third capacitor C3 needs to be charged, and voltages at the two terminals of the third capacitor C3 need to be increased to E/4 by means of charging.

On a basis of Embodiment 1, Embodiment 2 of the present disclosure provides two solutions to pre-charging of the third capacitor C3.

Figure 11:
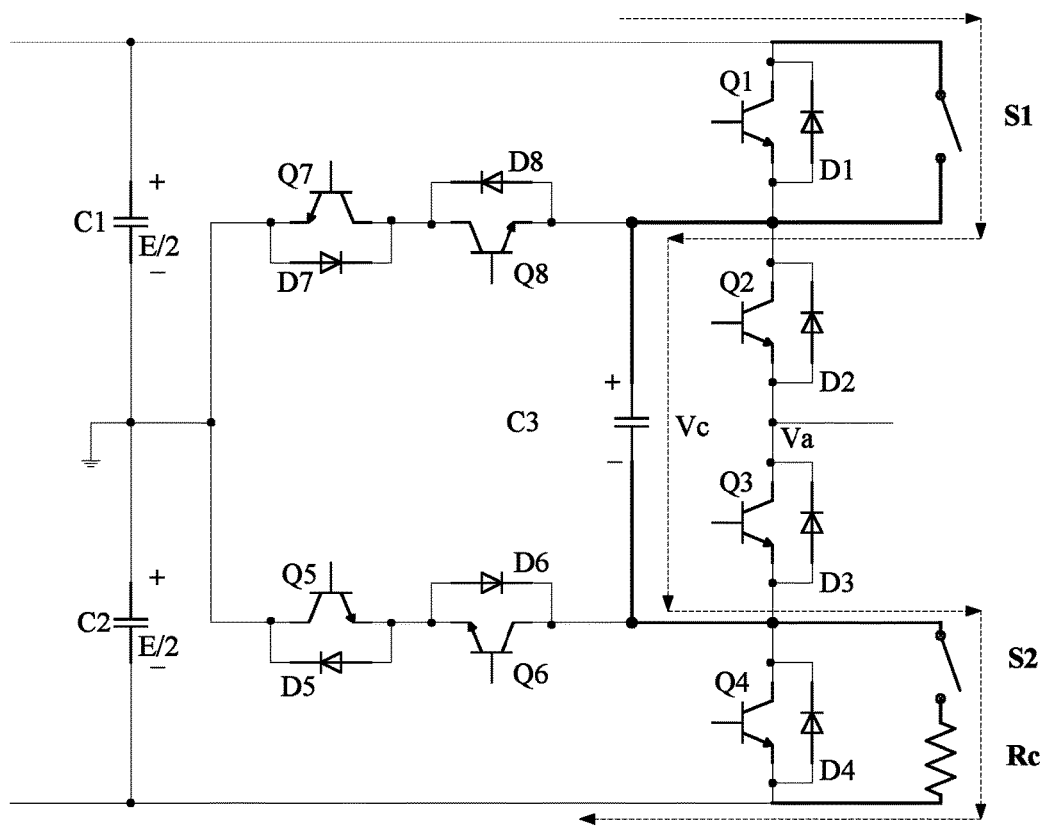
FIG. 11 is a circuit diagram of a first implementation of a multi-level inverter according to Embodiment 2 of the present disclosure.

In a first solution, as shown in FIG. 11, a first switch S1, a second switch S2, and a resistor Rc are added to the multi-level inverter 100 in Embodiment 1 of the present disclosure, to implement a function of pre-charging the third capacitor C3. The first switch S1 is connected in parallel to two terminals of the first switching tube Q1 and two terminals of a first diode D1. The second switch S2 is connected in parallel to two terminals of the fourth switching tube Q4 and two terminals of a fourth diode D4 after being connected in series to the resistor Rc.

Before the multi-level inverter 100 works, all switching tubes Q1 to Q8 are in a turn-off state. In this case, the first switch S1 and the second switch S2 are closed, and direct current input power supply E charges the third capacitor C3 using the first switch S1, the second switch S2, and the resistor Rc. The resistor Rc is configured to limit a charging current. When voltages at two terminals of C3 are gradually increased to a voltage threshold Vcth, the first switch S1 and the second switch S2 are turned off, and then a circuit works normally. The first switch S1 and the second switch S2 may be a power semiconductor device, or may be a relay or an optical coupling device having turn-on and turn-off functions.

Figure 12:
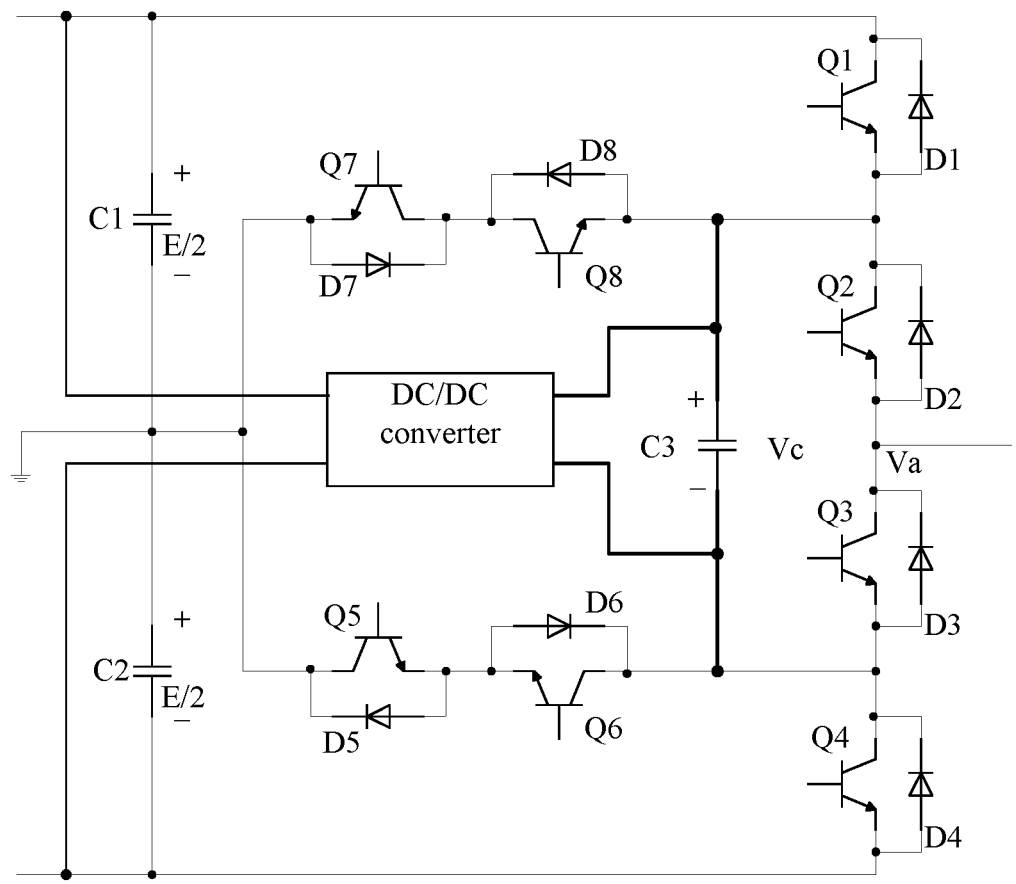
FIG. 12 is a circuit diagram of a second implementation of a multi-level inverter according to Embodiment 2 of the present disclosure.

In a second solution, as shown in FIG. 12, a DC/DC converter is added on a basis of Embodiment 1. Input terminals of the DC/DC converter are respectively connected to two terminals of a direct current power supply E, and output terminals of the DC/DC converter are respectively connected to two terminals of the third capacitor C3. Before the multi-level inverter works, all switching tubes Q1 to Q8 stay in a turn-off state. In this case, the DC/DC converter obtains electricity from direct current input power supply to charge the third capacitor C3 such that voltage Vc at the two terminals of the third capacitor C3 are increased to the voltage threshold Vcth. Then, the DC/DC converter is turned off, and the multi-level inverter can work normally. The DC/DC converter may be a forward DC/DC converter, a flyback DC/DC converter, a push-pull DC/DC converter, or another DC/DC converter.

Embodiment 3

Figure 13:
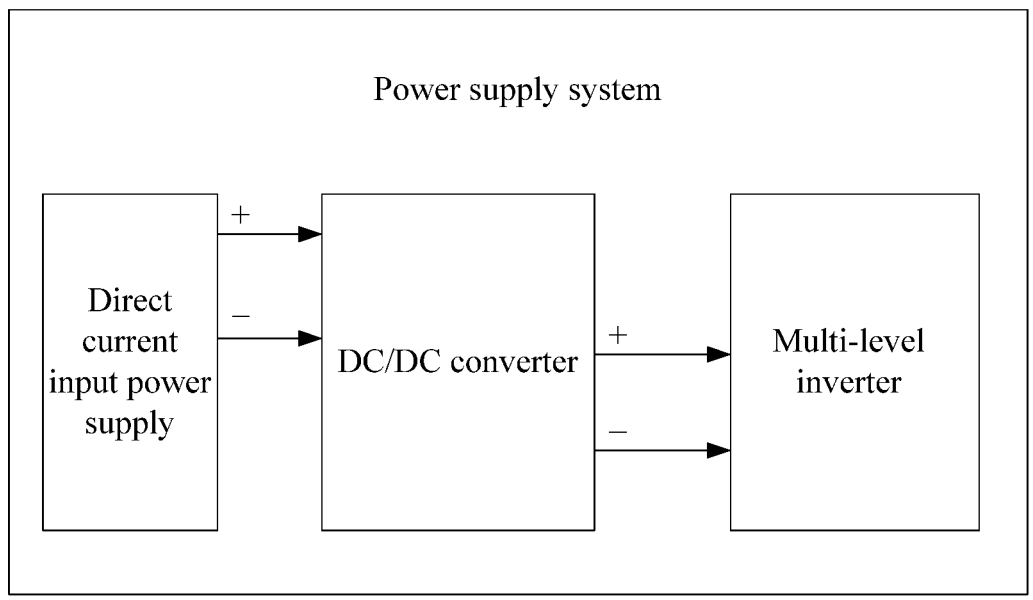
FIG. 13 is a schematic diagram of a power supply system according to Embodiment 3 of the present disclosure.

As shown in FIG. 13, Embodiment 3 of the present disclosure provides a power supply system. The power supply system includes a direct current input power supply E, a DC/DC converter, and a multi-level inverter.

A circuit structure and a control principle of the multi-level inverter in this embodiment are the same as those of the multi-level inverter in Embodiment 1 or Embodiment 2. For the circuit structure and control principle of the multi-level inverter, details are not described herein again.

The direct current input power supply E may be a solar panel array or an energy storage device, such as a chargeable battery pack or a fuel cell stack.

Output terminals of the direct current power supply are connected to input terminals of the DC/DC converter, to transport direct current to the DC/DC converter. Output terminals of the DC/DC converter are connected to input terminals of the multi-level inverter, to transmit converted electric energy to the multi-level inverter. The multi-level inverter converts direct current transmitted from the direct current power supply into alternating current, and then outputs the alternating current to a load or a power grid, to implement alternating current power supply.

When the direct current power supply is a solar panel, after the solar panel converts light energy into electric energy, output terminals of the solar panel are connected to the input terminals of the DC/DC converter. The output terminals of the DC/DC converter are connected to the input terminals of the multi-level inverter in order to transport, to the multi-level inverter, current and voltage that are obtained by means of rectification. The output terminals of the multi-level inverter are connected to the power grid in order to transport, to the power grid, alternating current obtained by the multi-level inverter by means of inversion, and further to implement power supply and grid connection.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A multi-level inverter configured to couple to a direct current input power supply and comprising:
   a direct current input comprises a first capacitor C1 and a second capacitor C2, the first capacitor C1 and the second capacitor C2 coupled in series between a positive electrode and a negative electrode of the direct current input power supply;
   an inverter comprising a first switching tube Q1, a second switching tube Q2, a third switching tube Q3, and a fourth switching tube Q4 coupled in series co-directionally between the positive electrode and the negative electrode of the direct current input power supply in a sequence of Q1, Q2, Q3, and Q4;

a first bidirectional switch having two terminals, one terminal of the first bidirectional switch coupled to a connection point between the third switching tube Q3 and the fourth switching tube Q4, and the other terminal of the first bidirectional switch coupled to a connection point between the first capacitor C1 and the second capacitor C2 to implement bidirectional turn-on and turn-off control of current that is between two terminals of the first bidirectional switch;

a second bidirectional switch having two terminals, one terminal of the second bidirectional switch coupled to a connection point between the first switching tube Q1 and the second switching tube Q2, and the other terminal of the second bidirectional switch coupled to the connection point between the first capacitor C1 and the second capacitor C2 to implement bidirectional turn-on and turn-off control of current that is between two terminals of the second bidirectional switch;

a third capacitor C3 having a positive electrode and a negative electrode, the positive electrode of the third capacitor C3 coupled to the connection point between the first switching tube Q1 and the second switching tube Q2, the negative electrode of the third capacitor C3 coupled to the connection point between the third switching tube Q3 and the fourth switching tube Q4, and each of the switching tubes Q1 to Q4 reversely coupled in parallel to a diode; and a first switch S1, a second switch S2, and a resistor Rc, the first switch S1 being coupled in parallel to two terminals of the first switching tube Q1, and the second switch S2 being coupled in parallel to two terminals of the fourth switching tube Q4 after being coupled in series to the resistor Rc, the first switch S1 and the second switch S2 being turned on when all switching tubes Q1 to Q4 are in a turned-off state, to conductively connect to the direct current input power supply, so that the direct current input power supply charges the third capacitor C3 through the first switch S1 and the second switch S2 before the multi-level inverter works.

2. The multi-level inverter of claim 1, wherein the first bidirectional switch comprises a fifth switching tube Q5 and a sixth switching tube Q6 that are reversely coupled in series, one terminal of the fifth switching tube Q5 is coupled to the connection point between the first capacitor C1 and the second capacitor C2, the other terminal of the fifth switching tube Q5 is coupled to one terminal of the sixth switching tube Q6, and the other terminal of the sixth switching tube Q6 is coupled to the connection point between the third switching tube Q3 and the fourth switching tube Q4.

3. The multi-level inverter of claim 1, wherein the second bidirectional switch comprises a seventh switching tube Q7 and an eighth switching tube Q8 that are reversely coupled in series, one terminal of the seventh switching tube Q7 is coupled to the connection point between the first capacitor C1 and the second capacitor C2, the other terminal of the seventh switching tube Q7 is coupled to one terminal of the eighth switching tube Q8, and the other terminal of the eighth switching tube Q8 is coupled to the connection point between the first switching tube Q1 and the second switching tube Q2.

4. The multi-level inverter of claim 3, wherein each switching tube in either the first bidirectional switch or the second bidirectional switch is reversely coupled in parallel to a diode.

5. The multi-level inverter of claim 1, wherein the multi-level inverter further comprises a DC/DC converter comprising two input terminals and two output terminals, the two input terminals are respectively coupled to two terminals of the direct current input, and the two output terminals are respectively coupled to two terminals of the third capacitor C3.

6. The multi-level inverter of claim 1, further comprising a filter comprising an input terminal coupled to a connection point between the second switching tube Q2 and the third switching tube Q3.

7. A power supply system, comprising:
a direct current input power supply;
a DC/DC converter comprising input terminals coupled to output terminals of the direct current input power supply; and
a multi-level inverter comprising:
a direct current input comprising a first capacitor C1 and a second capacitor C2, the first capacitor C1 and the second capacitor C2 coupled in series between positive and negative terminals of the direct current input power supply;
an inverter comprising a first switching tube Q1, a second switching tube Q2, a third switching tube Q3, and a fourth switching tube Q4 coupled in series co-directionally between positive and negative electrodes of the direct current input power supply in a sequence of Q1, Q2, Q3, and Q4, and each of the switching tubes Q1 to Q4 is reversely coupled in parallel to a diode;
a filter comprising an input terminal and an output terminal, the input terminal coupled to a connection point between the second switching tube Q2 and the third switching tube Q3, and the output terminal configured to couple to a power grid;
a first bidirectional switch, one terminal of the first bidirectional switch coupled to a connection point between the third switching tube Q3 and the fourth switching tube Q4, and the other terminal of the first bidirectional switch coupled to a connection point between the first capacitor C1 and the second capacitor C2 in order to implement bidirectional turn-on and turn-off control of current that is between two terminals of the first bidirectional switch;
a second bidirectional switch, one terminal of the second bidirectional switch coupled to a connection point between the first switching tube Q1 and the second switching tube Q2, and the other terminal of the second bidirectional switch coupled to the connection point between the first capacitor C1 and the second capacitor C2 in order to implement bidirectional turn-on and turn-off control of current that is between two terminals of the second bidirectional switch;
a third capacitor C3, a positive terminal of the third capacitor C3 coupled to the connection point between the first switching tube Q1 and the second switching tube Q2, and a negative terminal of the third capacitor C3 coupled to the connection point between the third switching tube Q3 and the fourth switching tube Q4;
output terminals configured to couple to the power grid in order to transport alternating current from the multi-level inverter to the power grid;
input terminals coupled to output terminals of the DC/DC converter; and
a first switch S1, a second switch S2, and a resistor Rc, the first switch S1 being coupled in parallel to two terminals of the first switching tube Q1, and the second switch S2 being coupled in parallel to two terminals of the fourth switching tube Q4 after being coupled in series to the resistor Rc, the first switch S1 and the second switch S2 being turned on when all switching tubes Q1 to Q4 are in a turned-off state, to conductively connect to the direct current input power supply, so that the direct current input power supply charges the third capacitor C3 through the first switch S1 and the second switch S2 before the multi-level inverter works.

8. The power supply system of claim 7, wherein the first bidirectional switch comprises a fifth switching tube Q5 and a sixth switching tube Q6 that are reversely coupled in series, one terminal of the fifth switching tube Q5 is coupled to the connection point between the first capacitor C1 and the second capacitor C2, the other terminal of the fifth switching tube Q5 is coupled to one terminal of the sixth switching tube Q6, and the other terminal of the sixth switching tube Q6 is coupled to the connection point between the third switching tube Q3 and the fourth switching tube Q4.

9. The power supply system of claim 7, wherein the second bidirectional switch comprises a seventh switching tube Q7 and an eighth switching tube Q8 that are reversely coupled in series, one terminal of the seventh switching tube Q7 is coupled to the connection point between the first capacitor C1 and the second capacitor C2, the other terminal of the seventh switching tube Q7 is coupled to one terminal of the eighth switching tube Q8, and the other terminal of the eighth switching tube Q8 is coupled to the connection point between the first switching tube Q1 and the second switching tube Q2.

10. The power supply system of claim 9, wherein each switching tube in either the first bidirectional switch or the second bidirectional switch is reversely coupled in parallel to a diode.

11. The power supply system of claim 10, wherein the direct current input power supply comprises a solar panel or a solar battery pack.

12. A multi-level inverter configured to couple to a direct current input power supply, comprising:
a direct current input comprising a first capacitor C1 and a second capacitor C2, the first capacitor C1 and the second capacitor C2 coupled in series between positive and negative electrodes of the direct current input power supply;
an inverter comprising a first switching tube Q1, a second switching tube Q2, a third switching tube Q3, and a fourth switching tube Q4 coupled in series co-directionally between the positive and negative electrodes of the direct current input power supply in a sequence of Q1, Q2, Q3, and Q4;
a first bidirectional switch having one terminal that is coupled to a connection point between the third switching tube Q3 and the fourth switching tube Q4, and another terminal that is coupled to a connection point between the first capacitor C1 and the second capacitor C2 to implement bidirectional turn-on and turn-off control of current that is between two terminals of the first bidirectional switch;
a second bidirectional switch having one terminal that is coupled to a connection point between the first switching tube Q1 and the second switching tube Q2, and another terminal that is coupled to the connection point between the first capacitor C1 and the second capacitor C2 to implement bidirectional turn-on and turn-off control of current that is between two terminals of the second bidirectional switch;
a third capacitor C3 having a positive electrode coupled to the connection point between the first switching tube Q1 and the second switching tube Q2, and a negative electrode coupled to the connection point between the third switching tube Q3 and the fourth switching tube Q4; and
a first switch S1, a second switch S2, and a resistor Rc, the first switch S1 being coupled in parallel to two terminals of the first switching tube Q1, and the second switch S2 being coupled in parallel to two terminals of the fourth switching tube Q4 after being coupled in series to the resistor Re, the first switch S1 and the second switch S2 being turned on when all switching tubes Q1 to Q4 are in a turned-off state, to conductively connect to the direct current input power supply, so that the direct current input power supply charges the third capacitor C3 through the first switch S1 and the second switch S2 before the multi-level inverter works.

13. The multi-level inverter of claim 12, further comprising at least one diode each is reversely coupled one of the switching tubes Q1 to Q4.

14. The multi-level inverter of claim 13, wherein the first bidirectional switch comprises a fifth switching tube Q5 and a sixth switching tube Q6 that are reversely coupled in series, one terminal of the fifth switching tube Q5 is coupled to the connection point between the first capacitor C1 and the second capacitor C2, the other terminal of the fifth switching tube Q5 is coupled to one terminal of the sixth switching tube Q6, and the other terminal of the sixth switching tube Q6 is coupled to the connection point between the third switching tube Q3 and the fourth switching tube Q4.

15. The multi-level inverter of claim 13, wherein the second bidirectional switch comprises a seventh switching tube Q7 and an eighth switching tube Q8 that are reversely coupled in series, one terminal of the seventh switching tube Q7 is coupled to the connection point between the first capacitor C1 and the second capacitor C2, the other terminal of the seventh switching tube Q7 is coupled to one terminal of the eighth switching tube Q8, and the other terminal of the eighth switching tube Q8 is coupled to the connection point between the first switching tube Q1 and the second switching tube Q2.

16. The multi-level inverter of claim 15, wherein each switching tube in either the first bidirectional switch or the second bidirectional switch is reversely coupled in parallel to a diode.

* * * * *